(12) United States Patent
Yano

(10) Patent No.: US 8,150,179 B2
(45) Date of Patent: Apr. 3, 2012

(54) IMAGE PROCESSING APPARATUS

(75) Inventor: Takanori Yano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1041 days.

(21) Appl. No.: 12/078,265

(22) Filed: Mar. 28, 2008

(65) Prior Publication Data

US 2008/0247655 A1    Oct. 9, 2008

(30) Foreign Application Priority Data

Apr. 6, 2007  (JP) ................. 2007-099982

(51) Int. Cl.
*G06K 9/36* (2006.01)
*G06K 9/46* (2006.01)

(52) U.S. Cl. ...................................... 382/233

(58) Field of Classification Search .......... 382/232, 382/233, 240, 248
See application file for complete search history.

(56) References Cited

U.S. PATENT DOCUMENTS

| | | | |
|---|---|---|---|
| 6,226,011 B1 | 5/2001 | Sakuyama et al. | |
| 7,245,775 B2 | 7/2007 | Kodama et al. | |
| 7,310,447 B2 | 12/2007 | Yano et al. | |
| 7,333,664 B2 | 2/2008 | Sakuyama et al. | |
| 2004/0100654 A1 | 5/2004 | Kodama et al. | |
| 2004/0126019 A1 | 7/2004 | Ikebe et al. | |
| 2004/0126029 A1 | 7/2004 | Sakuyama et al. | |
| 2004/0134978 A1 | 7/2004 | Hara et al. | |
| 2004/0151386 A1 | 8/2004 | Kodama et al. | |
| 2004/0151387 A1 | 8/2004 | Sakuyama et al. | |
| 2004/0190782 A1 | 9/2004 | Nomizu et al. | |
| 2004/0201593 A1 | 10/2004 | Nishimura et al. | |
| 2004/0202372 A1 | 10/2004 | Sakuyama et al. | |
| 2004/0217887 A1 | 11/2004 | Nomizu et al. | |
| 2004/0228534 A1 | 11/2004 | Sakuyama et al. | |
| 2004/0252897 A1 | 12/2004 | Hara et al. | |
| 2005/0031215 A1 | 2/2005 | Nomizu et al. | |
| 2005/0084158 A1 | 4/2005 | Yano | |
| 2005/0169542 A1 | 8/2005 | Yano | |
| 2005/0201624 A1* | 9/2005 | Hara et al. | 382/232 |
| 2006/0218295 A1 | 9/2006 | Yano | |
| 2007/0051817 A1 | 3/2007 | Yano | |

FOREIGN PATENT DOCUMENTS

JP    3719251    9/2005
JP    3988990    7/2007

OTHER PUBLICATIONS

Abstract of JP 2004-088425 published Mar. 18, 2004.
Abstract of JP 2004-289580 published Oct. 14, 2004.

* cited by examiner

*Primary Examiner* — Phuoc Tran
(74) *Attorney, Agent, or Firm* — Harness, Dickey & Pierce, PLC

(57) ABSTRACT

An image processing apparatus includes an encoder, a decoder, and a display unit. The encoder performs scalable encoding to encode input image data to obtain code data to be stored in a storage unit. The decoder decodes the code data stored in the storage unit to obtain decoded image data. The display unit displays an image based on the decoded image data, and receives an instruction to output the image. The image is output in response to the instruction. The decoder decodes only subcode data which is part of the code data.

17 Claims, 33 Drawing Sheets

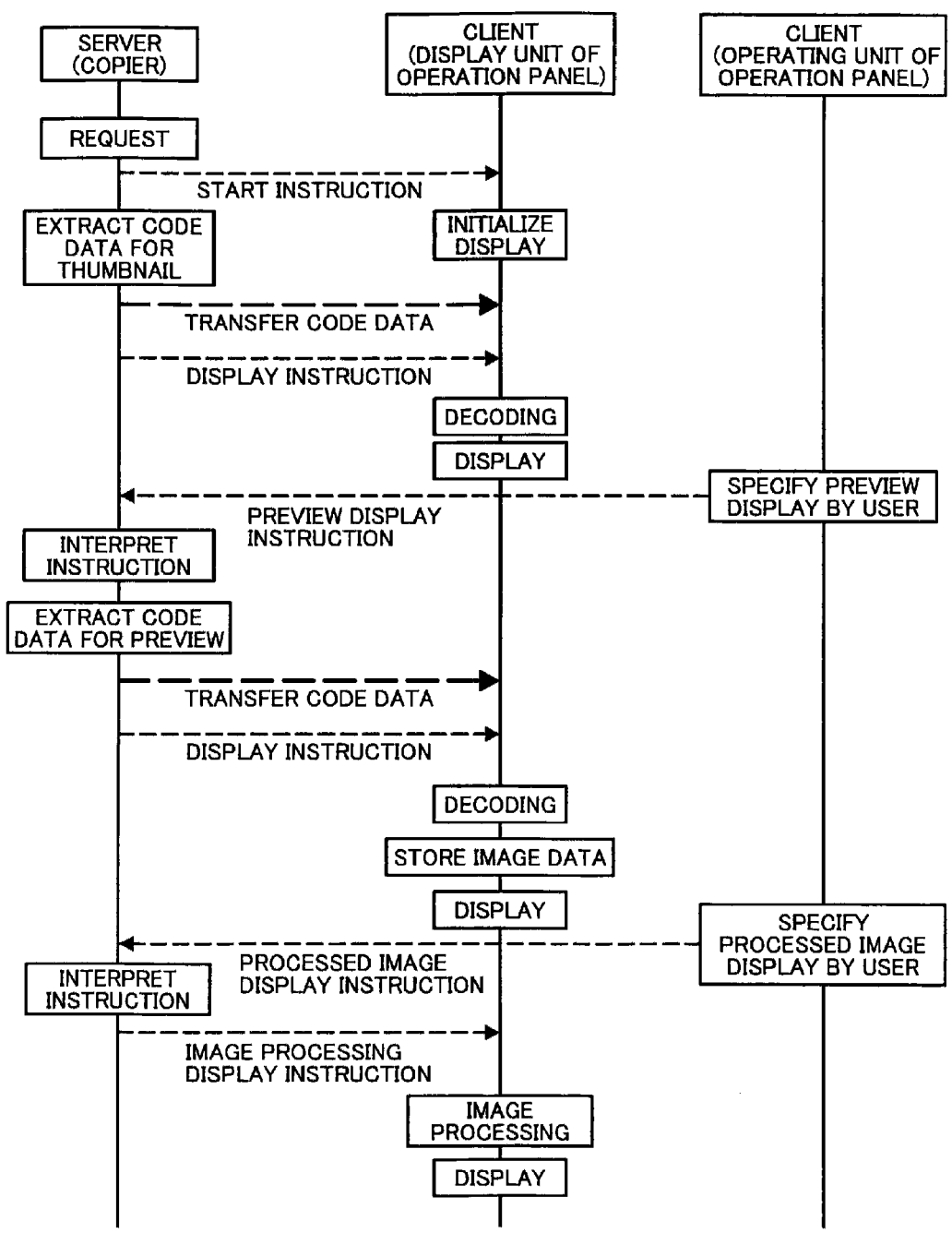

FIG. 13

[ORIGINAL CODE DATA]

| SOC | Main Header | SOT | Tile 1 Header | SOD | SOP | LL0(1) |
|---|---|---|---|---|---|---|
| | | | | | SOP | HL1(2)LH1(2)HH1(2) |
| | | | | | SOP | HL2(3)LH2(3)HH2(3) |
| | | | | | SOP | HL3(4)LH3(4)HH3(4) |
| | | SOT | Tile 2 Header | SOD | SOP | LL0(1) |
| | | | | | SOP | HL1(2)LH1(2)HH1(2) |
| | | | | | SOP | HL2(3)LH2(3)HH2(3) |
| | | | | | SOP | HL3(4)LH3(4)HH3(4) |
| | | SOT | Tile 3 Header | SOD | SOP | LL0(1) |
| | | | | | SOP | HL1(2)LH1(2)HH1(2) |
| | | | | | SOP | HL2(3)LH2(3)HH2(3) |
| | | | | | SOP | HL3(4)LH3(4)HH3(4) |
| | | SOT | Tile 4 Header | SOD | SOP | LL0(1) |
| | | | | | SOP | HL1(2)LH1(2)HH1(2) |
| | | | | | SOP | HL2(3)LH2(3)HH2(3) |
| | | | | | SOP | HL3(4)LH3(4)HH3(4) | EOC |

[SUBCODE DATA]

| SOC | Main Header | SOT | Tile 1 Header | SOD | SOP | LL0(1) | |
|---|---|---|---|---|---|---|---|
| | | SOT | Tile 3 Header | SOD | SOP | LL0(1) | EOC |
| SOC | Main Header | SOT | Tile 1 Header | SOD | SOP | HL1(2)LH1(2)HH1(2) | |
| | | SOT | Tile 3 Header | SOD | SOP | HL2(2)LH2(2)HH2(2) | EOC |
| SOC | Main Header | SOT | Tile 1 Header | SOD | SOP | HL2(3)LH2(3)HH2(3) | |
| | | SOT | Tile 3 Header | SOD | SOP | HL2(3)LH2(3)HH2(3) | EOC |
| SOC | Main Header | SOT | Tile 1 Header | SOD | SOP | HL3(4)LH3(4)HH3(4) | |
| | | SOT | Tile 3 Header | SOD | SOP | HL3(4)LH3(4)HH3(4) | EOC |

FIG. 25
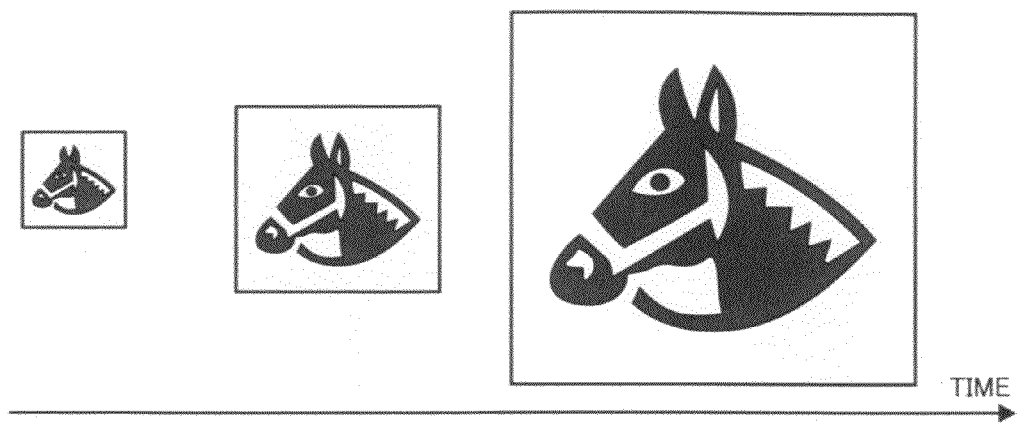
FIG. 26
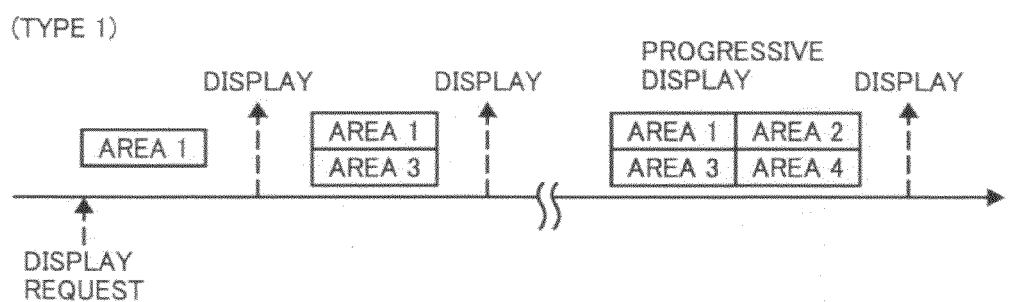
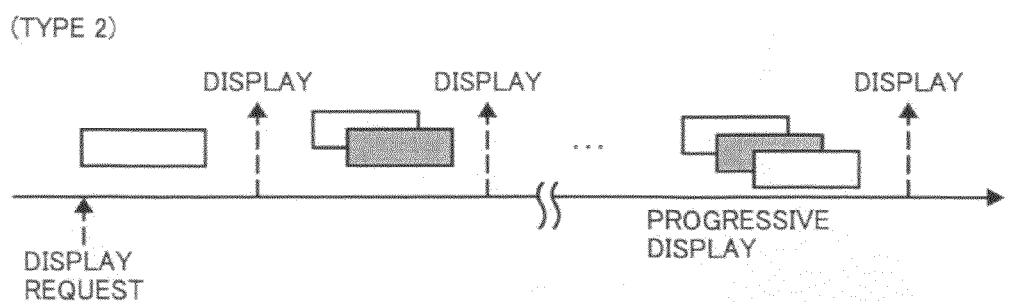

FIG. 29

| SOC | Main Header | SOT | Tile Header | SOD | PACKET 1 TO PACKET 12 | EOC |

FIG. 30

| PACKET 1: AREA 1, LAYER 1 | PACKET 5: AREA 2, LAYER 1 | PACKET 9: AREA 3, LAYER 1 |
|---|---|---|
| PACKET 2: AREA 1, LAYER 2 | PACKET 6: AREA 2, LAYER 2 | PACKET 10: AREA 3, LAYER 2 |
| PACKET 3: AREA 1, LAYER 3 | PACKET 7: AREA 2, LAYER 3 | PACKET 11: AREA 3, LAYER 3 |
| PACKET 4: AREA 1, LAYER 4 | PACKET 8: AREA 2, LAYER 4 | PACKET 12: AREA 3, LAYER 4 |

FIG. 31

NO.1 (AREA)

| SOC | Main Header | SOT | Tile Header | SOD | PACKET GROUP OF LAYER 1 | EOC |

NO.2 (AREA)

| SOC | Main Header | SOT | Tile Header | SOD | PACKET GROUP OF LAYER 2 | EOC |

NO.3 (AREA)

| SOC | Main Header | SOT | Tile Header | SOD | PACKET GROUP OF LAYER 3 | EOC |

NO.1 (LAYER 1)
| SOC | Main Header | SOT | Tile Header | SOD | PACKET GROUP OF LAYER 1 | EOC |

NO.2 (LAYER 2)
| SOC | Main Header | SOT | Tile Header | SOD | PACKET GROUP OF LAYER 2 | EOC |

NO.3 (LAYER 3)
| SOC | Main Header | SOT | Tile Header | SOD | PACKET GROUP OF LAYER 3 | EOC |

NO.4 (LAYER 4)
| SOC | Main Header | SOT | Tile Header | SOD | PACKET GROUP OF LAYER 4 | EOC |

| SUBCODE IDENTIFICATION MARK | STARTING ADDRESS |
|---|---|
| TILE 1 : A (RESOLUTION r) | |
| TILE 1 : A (RESOLUTION 2r) | |
| TILE 1 : A (RESOLUTION 3r) | |
| TILE 1 : A (RESOLUTION 4r) | |
| ⋮ | |
| TILE 1 : A (RESOLUTION r) | |
| TILE 1 : A (RESOLUTION 2r) | |
| TILE 1 : A (RESOLUTION 3r) | |
| TILE 1 : A (RESOLUTION 4r) | |

FIG. 43

LRCP

| PACKET 0 | PACKET 1 | PACKET 2 | PACKET 3 | PACKET 4 | PACKET 5 |
|---|---|---|---|---|---|
| LAYER 0 RESOLUTION LEVEL 0 COMPONENT 0 PRECINCT 0 | LAYER 0 RESOLUTION LEVEL 0 COMPONENT 1 PRECINCT 0 | LAYER 0 RESOLUTION LEVEL 0 COMPONENT 2 PRECINCT 0 | LAYER 0 RESOLUTION LEVEL 1 COMPONENT 0 PRECINCT 0 | LAYER 0 RESOLUTION LEVEL 1 COMPONENT 1 PRECINCT 0 | LAYER 0 RESOLUTION LEVEL 1 COMPONENT 2 PRECINCT 0 |

| PACKET 6 | PACKET 7 | PACKET 8 | PACKET 9 | PACKET 10 | PACKET 11 |
|---|---|---|---|---|---|
| LAYER 0 RESOLUTION LEVEL 2 COMPONENT 0 PRECINCT 0 | LAYER 0 RESOLUTION LEVEL 2 COMPONENT 0 PRECINCT 1 | LAYER 0 RESOLUTION LEVEL 2 COMPONENT 0 PRECINCT 2 | LAYER 0 RESOLUTION LEVEL 2 COMPONENT 0 PRECINCT 3 | LAYER 0 RESOLUTION LEVEL 2 COMPONENT 1 PRECINCT 0 | LAYER 0 RESOLUTION LEVEL 2 COMPONENT 1 PRECINCT 1 |

| PACKET 12 | PACKET 13 | PACKET 14 | PACKET 15 | PACKET 16 | PACKET 17 |
|---|---|---|---|---|---|
| LAYER 0 RESOLUTION LEVEL 2 COMPONENT 1 PRECINCT 2 | LAYER 0 RESOLUTION LEVEL 2 COMPONENT 1 PRECINCT 3 | LAYER 0 RESOLUTION LEVEL 2 COMPONENT 2 PRECINCT 0 | LAYER 0 RESOLUTION LEVEL 2 COMPONENT 2 PRECINCT 1 | LAYER 0 RESOLUTION LEVEL 2 COMPONENT 2 PRECINCT 2 | LAYER 0 RESOLUTION LEVEL 2 COMPONENT 2 PRECINCT 3 |

| PACKET 18 | PACKET 19 | PACKET 20 | PACKET 21 | PACKET 22 | PACKET 23 |
|---|---|---|---|---|---|
| LAYER 1 RESOLUTION LEVEL 0 COMPONENT 0 PRECINCT 0 | LAYER 1 RESOLUTION LEVEL 0 COMPONENT 1 PRECINCT 0 | LAYER 1 RESOLUTION LEVEL 0 COMPONENT 2 PRECINCT 0 | LAYER 1 RESOLUTION LEVEL 1 COMPONENT 0 PRECINCT 0 | LAYER 1 RESOLUTION LEVEL 1 COMPONENT 1 PRECINCT 0 | LAYER 1 RESOLUTION LEVEL 1 COMPONENT 2 PRECINCT 0 |

| PACKET 24 | PACKET 25 | PACKET 26 | PACKET 27 | PACKET 28 | PACKET 29 |
|---|---|---|---|---|---|
| LAYER 1 RESOLUTION LEVEL 2 COMPONENT 0 PRECINCT 0 | LAYER 1 RESOLUTION LEVEL 2 COMPONENT 0 PRECINCT 1 | LAYER 1 RESOLUTION LEVEL 2 COMPONENT 0 PRECINCT 2 | LAYER 1 RESOLUTION LEVEL 2 COMPONENT 0 PRECINCT 3 | LAYER 1 RESOLUTION LEVEL 2 COMPONENT 1 PRECINCT 0 | LAYER 1 RESOLUTION LEVEL 2 COMPONENT 1 PRECINCT 1 |

| PACKET 30 | PACKET 31 | PACKET 32 | PACKET 33 | PACKET 34 | PACKET 35 |
|---|---|---|---|---|---|
| LAYER 1 RESOLUTION LEVEL 2 COMPONENT 1 PRECINCT 2 | LAYER 1 RESOLUTION LEVEL 2 COMPONENT 1 PRECINCT 3 | LAYER 1 RESOLUTION LEVEL 2 COMPONENT 2 PRECINCT 1 | LAYER 1 RESOLUTION LEVEL 2 COMPONENT 2 PRECINCT 2 | LAYER 1 RESOLUTION LEVEL 2 COMPONENT 2 PRECINCT 3 | LAYER 1 RESOLUTION LEVEL 2 COMPONENT 2 PRECINCT 4 |

LRCP

| PACKET 0 | PACKET 1 | PACKET 2 | PACKET 3 | PACKET 4 | PACKET 5 |
|---|---|---|---|---|---|
| LAYER 0 RESOLUTION LEVEL 0 COMPONENT 0 PRECINCT 0 | LAYER 0 RESOLUTION LEVEL 0 COMPONENT 1 PRECINCT 0 | LAYER 0 RESOLUTION LEVEL 0 COMPONENT 2 PRECINCT 0 | LAYER 0 RESOLUTION LEVEL 1 COMPONENT 0 PRECINCT 0 | LAYER 0 RESOLUTION LEVEL 1 COMPONENT 1 PRECINCT 0 | LAYER 0 RESOLUTION LEVEL 1 COMPONENT 2 PRECINCT 0 |

| PACKET 6 | PACKET 7 | PACKET 8 | PACKET 9 | PACKET 10 | PACKET 11 |
|---|---|---|---|---|---|
| LAYER 0 RESOLUTION LEVEL 0 COMPONENT 0 PRECINCT 0 | LAYER 0 RESOLUTION LEVEL 0 COMPONENT 0 PRECINCT 1 | LAYER 0 RESOLUTION LEVEL 0 COMPONENT 0 PRECINCT 2 | LAYER 0 RESOLUTION LEVEL 1 COMPONENT 0 PRECINCT 0 | LAYER 0 RESOLUTION LEVEL 1 COMPONENT 0 PRECINCT 1 | LAYER 0 RESOLUTION LEVEL 1 COMPONENT 0 PRECINCT 2 |

IMAGE PROCESSING APPARATUS

CROSS-REFERENCE TO RELATED APPLICATIONS

The present application claims priority to and incorporates by reference the entire contents of Japanese priority document 2007-099982 filed in Japan on Apr. 6, 2007.

BACKGROUND OF THE INVENTION

1. Field of the Invention

The present invention relates to an image processing apparatus.

2. Description of the Related Art

Image processing apparatuses have functions of decoding a scan image compressed by a joint photographic experts group (JPEG) codec, and displaying on its operation panel the thumbnail thereof and a preview image of the thumbnail specified by a user. With this function, the preview image can be partially cut out or enlarged to check the outline of the scan image. The decoded image data is stored in a work area of a memory for processing and editing the preview image. This requires all code data to be decoded to display an image. The code data is compressed by the JPEG codec, and thus image processing is complicated. Consequently, it takes time to wait for image display, and a work area with a large capacity is required to store image data.

For example, Japanese Patent No. 3719251 discloses a conventional technology in which, to transmit code data by email, the code data is encoded by scalable encoding, i.e., JPEG2000 encoding, so that a plurality of pages of subcode data is transmitted. Japanese Patent Application Laid-open No. 2004-088425 discloses another conventional technology in which, in process of editing code data, only the header is changed while other content and data are left unchanged. This enables decoding for reproduction at a resolution level different from that of an original image.

However, in the former conventional technology, because the technique is practiced by emails, the subcode data is extracted on a server side, which is the main unit of the image processing apparatus, and therefore a processing time is required. In the latter conventional technology, when the subcode data is selected and extracted, editing is performed in an encoded state. Because it is also the processing on a copier, a processing time is required.

SUMMARY OF THE INVENTION

It is an object of the present invention to at least partially solve the problems in the conventional technology.

According to an aspect of the present invention, there is provided an image processing apparatus includes an reading unit that reads an original to obtain image data; an encoder that encodes the image data to obtain code data; a storage unit that stores therein the code data; a decoder that decodes the code data to obtain decoded image data; a display unit that displays an image based on the decoded image data, and receives an instruction to output the image; and an output unit that outputs the image in response to the instruction. The encoder performs scalable encoding. The decoder decodes only subcode data, which is part of the code data.

According to another aspect of the present invention, there is provided an image processing apparatus includes an encoder that encodes image data to obtain code data; a receiving unit that receives the code data; a storage unit that stores therein the code data; a decoder that decodes the code data stored in the storage unit to obtain decoded image data; a display unit that displays an image based on the decoded image data, and receives an instruction to output the image; and an output unit that outputs the image in response to the instruction. The encoder performs scalable encoding. The decoder decodes only subcode data, which is part of the code data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a sequence diagram of a display process of displaying a thumbnail image or the like on an operation panel according to a conventional technology;

FIG. 13 is a schematic diagram for explaining extraction of part of code data;

FIG. 25 is examples of progressive preview display;

FIG. 26 is a schematic diagram for explaining typical patterns of progressive preview display;

FIG. 29 is a schematic diagram of a JPEG2000 codestream;

FIG. 30 is an example of code data including code strings referred to as packets;

FIGS. 31 and 32 are examples of the progression;

FIG. 33 is a functional block diagram of a decoder;

FIG. 43 is examples of JPEG2000 packets;

DETAILED DESCRIPTION OF THE PREFERRED EMBODIMENTS

Figure 1:
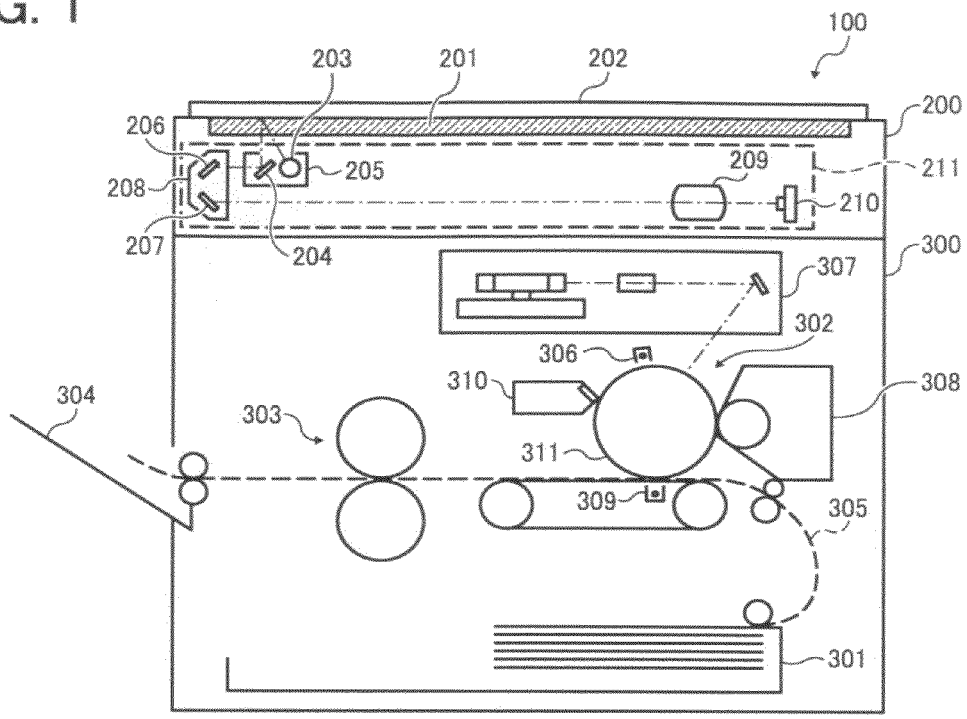
FIG. 1 is a schematic diagram of an image processing apparatus according to a first embodiment of the present invention.

Exemplary embodiments of the present invention are explained in detail below with reference to the accompanying drawings. Like reference numerals refer to like parts throughout the several views of the drawings. Although an image processing apparatus of the embodiments is explained below as a copier, it can be, for example, a multifunction product (MFP) that combines any or all of the functions of a copier, a facsimile machine, a printer, and a scanner.

FIG. 1 is a schematic diagram of a copier 100 as an image processing apparatus according to a first embodiment of the present invention. The copier 100 includes a scanner 200 that optically reads a document and a printer 300 that forms an image based on image data obtained by the scanner on a recording medium such as a sheet. Incidentally, the term "document" as used herein refer to an original that can be read by the scanner including image, text, photograph, and chart.

A exposure glass 201 is provided on an upper surface of a main body, on which a document (not shown) is placed. The document is placed thereon with the document face facing the exposure glass 201. A document platen 202 that holds the document placed on the exposure glass 201 is provided above the exposure glass 201. A first carrier 205 on which a light source 203 for emitting light and a mirror 204 are mounted, a second carrier on which two mirrors 206 and 207 are mounted, and a read optical system 211 including a charge coupled device (CCD) image sensor 210 that receives light guided by the mirrors 204, 206, and 207 via an imaging lens 209 are provided below the exposure glass 201. The CCD image sensor 210 functions as a photoelectric conversion element that generates photoelectric conversion data obtained by photoelectrically converting reflected light from the document imaged on the CCD image sensor 210. The photoelectric conversion data is a voltage value having a size corresponding to the intensity of the reflected light from the document. The first and the second carriers 205 and 208 are provided to be able to move back and forth along the exposure glass 201. The carriers are driven for scanning in a vertical scanning direction at a speed ratio of 2:1 by a moving apparatus such as a motor (not shown) at the time of performing a read process of a document image described later. Accordingly, exposure scanning of a document read area is performed by the read optical system 211. In the first embodiment, a stationary original exposure type in which the read optical system 211 performs scanning is explained; however, a moving original exposure type in which the read optical system 211 is fixed and the original is moved can be also used.

The printer 300 includes a media path 305 from a media holding unit 301 that holds the recording medium such as the sheet to an ejecting unit 304 via an electrophotographic printer engine 302 and a fuser 303. The printer engine 302 uses a charger 306, an exposing unit 307, a developing unit 308, a transfer unit 309, a cleaner 310, and the like to electrophotographically transfer a toner image formed on a photoconductor 311 onto a recording material, and fixes the transferred toner image on the recording material by the fuser 303. By way of example, and not as a limitation, the printer engine 302 electrophotographically forms an image. However, an image can be formed in various other ways such as inkjet printing, sublimation dye transfer printing, and direct thermosensitive recording. The copier 100 is controlled by a control system including a plurality of microcomputers.

Figure 2:
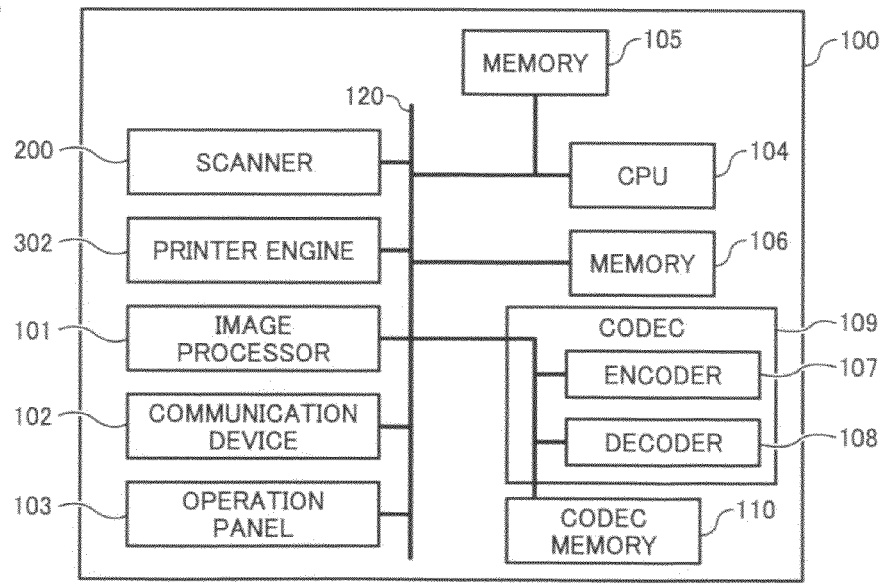
FIG. 2 is a functional block diagram of the image processing apparatus shown in FIG. 1.

FIG. 2 is a functional block diagram of the copier 100. The copier 100 includes the scanner 200 for reading the document, the printer engine 302 for printing, an image processor 101 for processing the image data, a communication device (network interface card (NIC)) 102 for communicating with a local area network (LAN), an operation panel 103 for setting by a user, a central processing unit (CPU) 104 that controls the copier 100, and memories 105 and 106 including a read only memory (ROM) and a random access memory (RAM). The operation panel 103 includes a display panel. The operation panel 103 has a function of receiving an operation instruction (operating unit) as well as a display function (display unit). The CPU 104 performs various types of calculation, and collectively controls processes such as image processing in the image processor 101. Various programs and fixed data related to a process executed by the CPU 104 are stored in the ROM of the memory 105. The RAM is a work area for the CPU 104, and image data and code data explained below are stored in the RAM. The ROM, which is a recording medium, includes a nonvolatile memory such as an electronically erasable and programmable ROM (EEPROM) or a flash memory. The program stored in the ROM can be rewritten to a program downloaded from an external device (not shown) via the communication device 102 under control of the CPU 104. That is, a program for realizing various functions is stored in the ROM, and the ROM functions as a recording medium storing the program. The respective devices are respectively connected to an internal bus 120 such as a protocol control information (PCI) bus. The image data or the code data input from the scanner 200, the communication device 102, or the like is transferred to the memory 106. The image data stored in the memory 106 is transmitted to a codec 109 including an encoder 107 and a decoder 108. The codec 109 encodes the image data by using a codec memory 110, and decodes the code data to the image data. The generated code data or the image data is stored in the memory 105. A file stored in the memory 105 can be transmitted to the memory 106 by DMA and accumulated. In this case, the code data or the image data stored in the memory 106 can be transferred to the memory 105. The CPU 104 can replace or reconstruct the code data (compressed data) stored in the memory 105.

Figure 3:
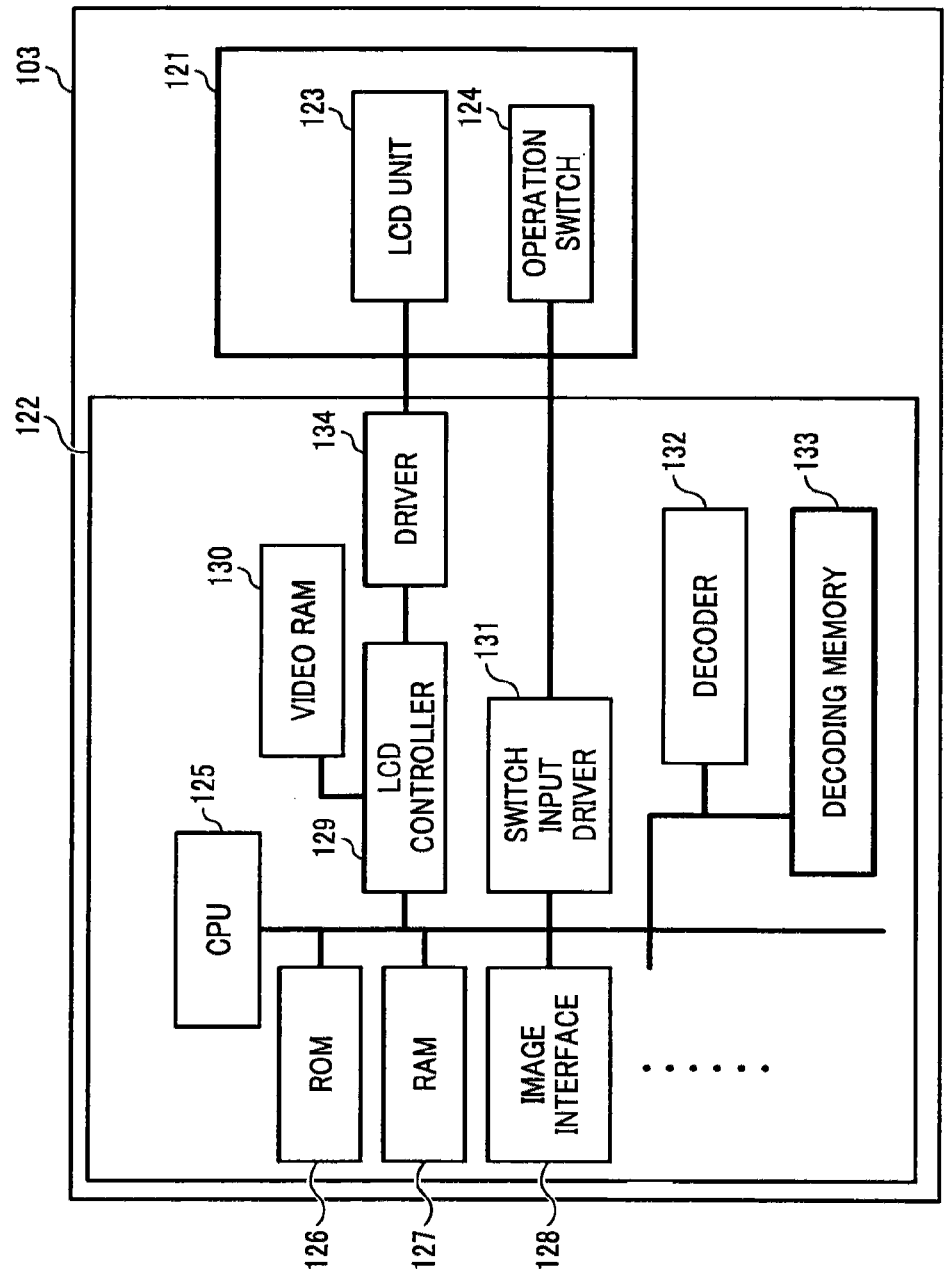
FIG. 3 is a functional block diagram of an operation panel shown in FIG. 2.

FIG. 3 is a functional block diagram of the operation panel 103. The operation panel 103 includes an operation board 121 and a control circuit 122. On the operation board 121, a LCD unit 123 and an operation switch 124 such as a key switch matrix are provided. The LCD unit 123 has, for example, 512×256 dot configuration. A transparent touch sheet is included in the operation switch 124. The control circuit 122 includes a CPU 125, a ROM 126, a RAM 127, an image interface 128, a liquid crystal display (LCD) controller 129, and a video RAM 130, a switch input driver 131, a decoder 132, a decoding memory 133, and driver 134. The ROM 126 holds predetermined fixed data such as information of a display control program for executing a display process relating to the LCD unit 123, an input determination program for identifying a key input from the transparent touch sheet, a communication control program, and a pointer, and information of various display elements. The RAM 127 in a consol includes a work area at the time of executing the program, and a display information area for holding two-dimensional image information corresponding to a two-dimensional display image to be displayed on the LCD unit 123 as bit map information. The two-dimensional image information has, for example, 512×256 pixel configuration, and a binary value of 0 or 1 of the respective pixels is allocated for the display information area. When the two-dimensional display image is displayed on the LCD unit 123, a display image is first created in a bitmap format in the display information area on the RAM 127, and the created image data is transferred to the video RAM 130. Accordingly, the LCD controller 129 displays the image information on the video RAM 130 on the LCD unit 123. An area for storing the two-dimensional display information is provided in the RAM 127 for a plurality of screens. The reason why the storage area is ensured for the screens is to allocate an independent screen area for each type of screens such as a copy mode setting screen and a copy and run screen, and to facilitate the control of image overlay.

When creating or updating the display image, the CPU 125 reads bit map information, vector information, character information, and the like of the display elements pre-recorded on the ROM 126 for each display element, and writes pattern information of the respective elements in the display information area on the RAM 127 as the image information. When the information in the display information area on the RAM 127 is transferred to the video RAM 130 including a dual port memory, the LCD controller 129 cyclically outputs the image information on the video RAM 130 to the switch input driver 131. Accordingly, the display screen is displayed on the LCD unit 123 as the two-dimensional screen. When pressing is detected at a position of each button (key) displayed on the transparent touch sheet, the copy mode and display content are changed according thereto. When the display content is to be changed, image information of a new display element is written on the RAM 127, and the information thereof is transferred to the video RAM 130. As for a screen of a fixed display content with low display frequency, for example, when a feed roller is broken, and as for a screen for urging a repair by a maintenance person to replace the part, because the two-dimensional display information is pre-registered on a magnetic disk, the entire information of one screen is read from the magnetic disk and directly written on the RAM 127, and the information on the RAM 127 is transferred to the video RAM 130.

The transparent touch sheet is overlapped on the display surface of the LCD unit 123. Therefore, the position of the pressed button on the display screen is detected. If a position where there is no button on the display screen is pressed, or a numerical value outside a predetermined range is input, the input is invalidated.

In a certain area of the ROM 126 in the console, information of respective display elements is registered in the bitmap format. The configuration of respective display element data is as follows. That is, icon identification code is id, attribute of the icon is a1, a2, . . . , ax, lateral length (number of pixels) is Lx, vertical length (number of pixels) is Ly, and pixel data bit string is d1, d2, d3, . . . , dn. Further, in a certain area of the ROM 126, information of coordinates and address pointer used by the display program are registered for each type of screen, for example, in a following configuration. That is, coordinate x1, y1 on which a first display element is arranged on the screen, a memory address in which the information of the first display element is registered, coordinate x2, y2 on which a second display element is arranged on the screen, a memory address in which the information of the second display element is registered, . . . , an identification mark of end of screen data. Therefore, according to the display program on the ROM 126, when an image on the display screen is created, the coordinate data (x, y) at a position where the image is arranged and the memory address in which the information of the element is registered are referred to for each display element, to read necessary information from the address, and the information is written at a position of the specified coordinate (x, y) in the display area on the RAM 127. The created image information on the RAM 127 is transferred to the video RAM 130 and written therein. The created image information is further transmitted to a computer PC via the CPU 104.

The input determination program registered on the ROM 126 of the operation panel 103 checks the coordinate (x, y) pressed on the transparent touch sheet. That is, the input determination program determines whether a specific button is input based on the arrangement address data, the icon ID, and the attribute. In the operation panel 103, the input determination program is activated with respect to an operation input. The input determination program is displayed on the LCD unit 123 at this time, so that a state parameter of the display screen, which has been also transmitted to the computer PC, can be known. The state parameter is held in the work area on the RAM 127. The state parameter is created by the display program, and includes information of ID of the button included in the display screen at that time, attribute, and coordinate. Therefore, according to the input determination program, it can be verified whether the coordinate xp, yp input from the computer PC is inside of a specific button by referring to the information of the state parameter. For example, if it is assumed that a display coordinate of a "call" button is x1, y1, a lateral length of the button is Lx, and a vertical length of the button is Ly, when both conditions of $x1 \leq xp \leq x1+Lx$, and $y1 \leq yp \leq y1+Ly$ are satisfied, it is determined that a point clicked by a mouse is inside of the "call" button.

The decoding memory 133 is used when the decoder 132 performs decoding. After the code data stored in the memory 105 or 106 is stored in the RAM 127, the code data is transferred to the decoder 132 and decoded by using the decoding memory 133, and the decoded image data is transferred to the RAM 127. At this time, coordinate data is set for the decoded image data so that the display elements are arranged in a predetermined layout. The created image information on the RAM 127 is transferred to the video RAM 130 and written therein. The image data displayed in one display is not necessarily one. Therefore, the code data to be decoded is not necessarily one. In this case, the code data is continuously decoded, and a plurality of decoded images is arranged in the determined layout, and the corresponding coordinate data is set for each decoded image.

Figure 4A:
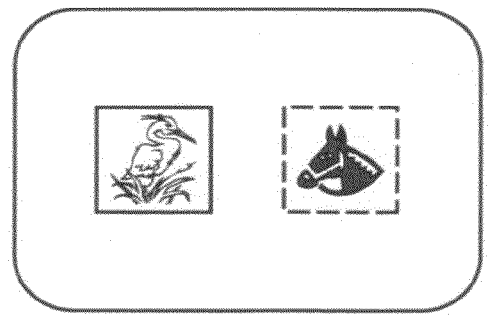
FIGS. 4A to 4D are examples of thumbnail image and preview image display of input image data on the operation panel.
Figure 4B:
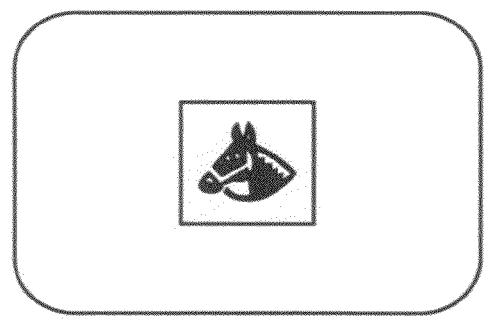
Figure 4C:
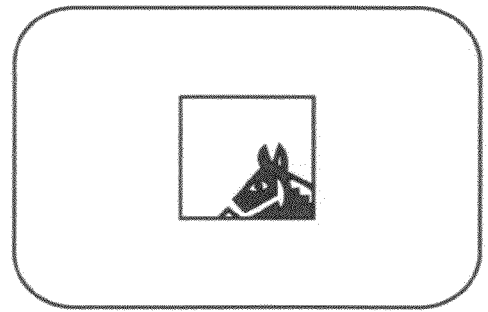
Figure 4D:
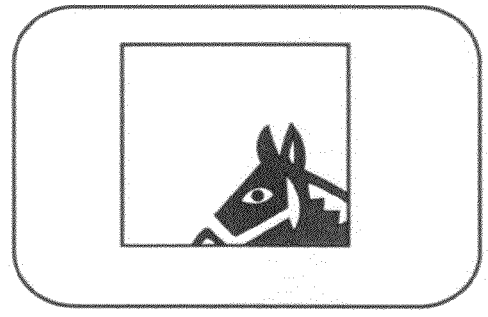

FIG. 4A is an example of a thumbnail image of image data read by the scanner displayed on the operation panel. FIG. 4B is an example of a preview image displayed on the operation panel. Control is performed such that after the thumbnail image capable of ascertaining an outline is displayed, the preview image capable of showing details of the image at the time of printing is displayed. Therefore, after the code data of a predetermined number of scan images is transferred to the RAM 127 on the operation panel 103, processing is performed by using these code data. The preview image has a function of processing and displaying the image to provide details, such that resolution scaling is performed or reproduction is performed, or because the operation panel is a narrow screen region, a rectangular area is cut out and redisplayed. FIG. 4C is an example of a cut-out rectangle. FIG. 4D is an example of a resolution scaled image.

FIG. 5 is a sequence diagram of a display process of displaying a thumbnail image or the like on an operation panel of a conventional image processing apparatus. FIG. 5 depicts an outline of the process performed between a server (copier or MFP) and a client (display unit of the operation panel) or a client (operating unit of the operation panel). Generally, a display request is made by the server for display on the operation panel. In this example, when a document is read by the scanner 200, a start instruction is issued to the operation panel, and after code data for thumbnail is transferred, display of a thumbnail image is requested. The display unit of the client operation panel initializes the display to prepare for the subsequent processing. The server extracts the code data for thumbnail from code data stored in the memory 105 or 106 to generate code data. The generated code data is transferred to the display unit of the client operation panel. Upon receipt of the code data, the display unit of the client operation panel performs decoding by the decoder 132 in response to a display instruction, and the display process is performed in such a manner that image data is transferred to the video RAM 130 through the above process to display an image on the LCD unit 123. In FIG. 5, signal transfer between the server and the display unit of the client operation panel is simplified. Although not shown, when a signal is transmitted, such a protocol for acknowledging the signal is returned in response thereto. Through the above procedure, the thumbnail image is displayed on the operation panel. As shown in FIG. 4A, a plurality of thumbnail images can be displayed on the operation panel. When a plurality of thumbnail images is displayed, the process from extraction of code data for thumbnail to thumbnail display shown in FIG. 5 is repeated. After the thumbnail is displayed, a user specifies the thumbnail by operating the operation panel to instruct display of the preview image. The preview display instruction is transferred from the operating unit of the client operation panel to the server. The server interprets the instruction content to extract code data required for creating a corresponding preview image, and transfers the code data to the display unit of the client operation panel. The display unit of the client operation panel performs decoding by the decoder 132, as described above, thereby displaying the decoded preview image on the LCD unit 123. At this time, the preview image is stored in an image processing work area of the RAM 127 to be used for image processing. The user then gives an instruction to cut out a rectangular area shown in FIG. 4C or to perform the resolution scaling shown in FIG. 4D from the operating unit of the client operation panel to the server in the same manner. When an image processing display instruction is received from the server, the display unit of the client operation panel performs instructed image processing based on the preview image data stored beforehand, thereby displaying the processed image on the LCD unit 123. Accordingly, not only a memory space for storing original preview image but also a space for image processing work area is required. That is, the conventional MFP (or copier) requires a memory having a large storage capacity on the operation panel for storing image data. Further, to re-display an image by changing the resolution or processing the image data, the complicated processing requires considerable processing time. Particularly, in the multi-object image processing, decoding takes a time. In the case of a multi-object image, because all code data of a plurality of objects are decoded, reproduced, and synthesized to reproduce the original image, not only a large storage capacity but also a waiting time is required for display due to a large throughput. Further, code data for thumbnail images needs to be prepared separately from code data for preview images.

As described above, according to the first embodiment, scalable encoding is used with respect to a scan image. Thus, cutout of subcode can be easily realized, and extraction of subcode data for thumbnail images, resolution scaling, and cutout of a rectangular area can be easily performed according to the scalable encoding. Encoding based on International Organization for Standardization/International Electrotechnical Commission (ISO/IEC) 15444-1 JPEG2000 standard is used in the process described herein because not only the above requirements are satisfied but also cutout of subcode data can be performed in a detailed level and editing of code data can be easily performed at a code level.

Figure 6:
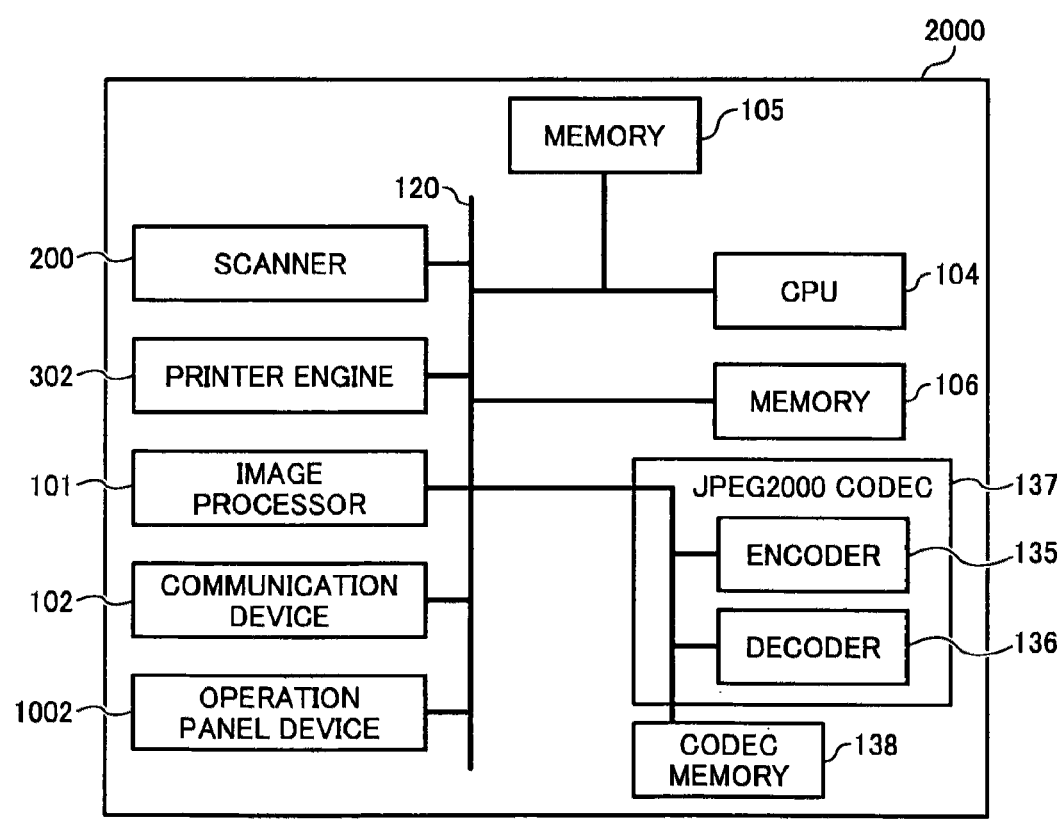
FIG. 6 is a functional block diagram of an image processing apparatus according to a second embodiment of the present invention.
Figure 7:
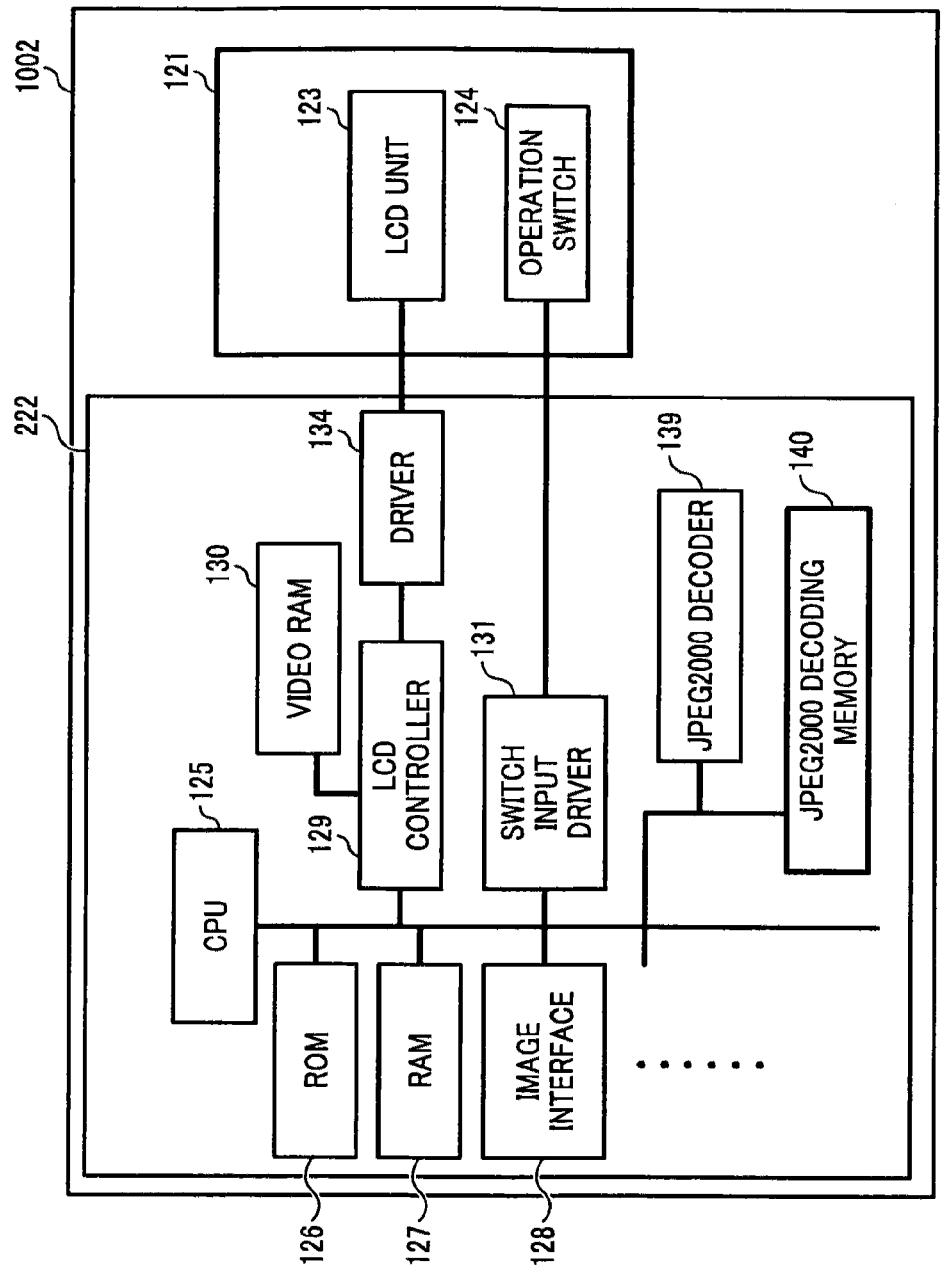
FIG. 7 is a functional block diagram of an operation panel shown in FIG. 6.

FIG. 6 is a functional block diagram of an image processing apparatus 2000 according to a second embodiment of the present invention. The image processing apparatus 2000 is of basically similar in configuration to the copier 100 except for a JPEG2000 codec 137, a codec memory 138, and an operation panel 1002. The JPEG2000 codec 137 includes a JPEG2000 encoder 135 and a JPEG2000 decoder 136. As shown in FIG. 7, the operation panel 1002 includes a control circuit 222 including a JPEG2000 decoder 139, and a JPEG2000 decoding memory.

Figure 8:
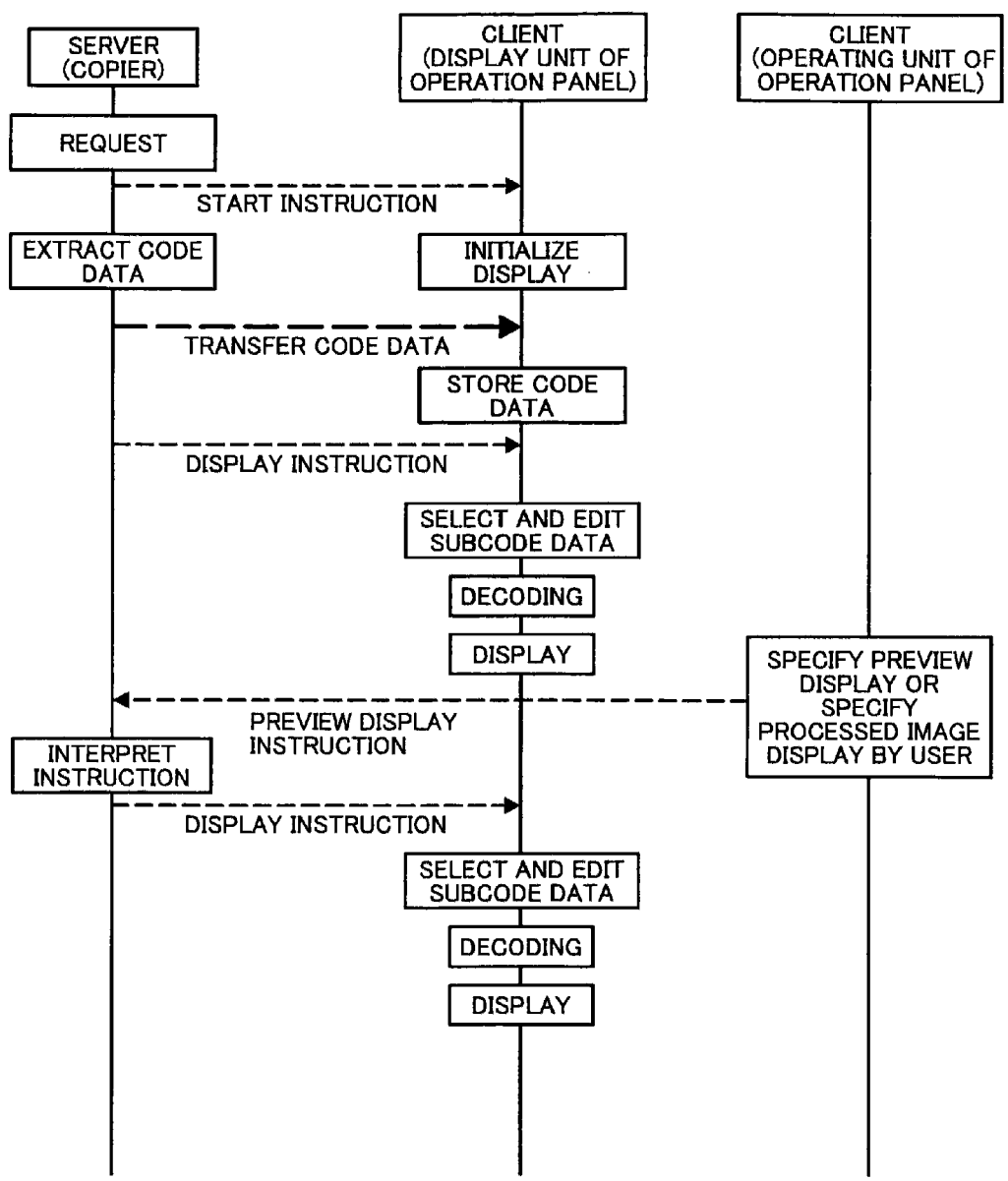
FIG. 8 is a sequence diagram of a display process of displaying a thumbnail image or the like on the operation panel.

FIG. 8 is a sequence diagram of a display process of displaying a thumbnail image or the like on the operation panel. In FIG. 8, a start instruction is issued from the server to the display unit of the client operation panel, and after code data is transferred, a display request is made for display of a thumbnail image. In the conventional example shown in FIG. 5, the code data for the thumbnail image is extracted and transferred, and the code data for preview display is extracted and transferred separately. In the second embodiment, by transferring the code data all at a time, a labor for the subsequent transfer is not required. Naturally, all or only part of the code data (subcode data) to be required can be transferred from the server to the display unit of the client operation panel. In this case, the user receives a request for preview display or image processing from the operating unit of the client operation panel, and the server selects the subcode data and transmits the selected subcode data to the display unit of the client operation panel. In FIG. 8, the subcode data is not selected by the server but by the display unit of the client operation panel to generate the code data to be decoded. According to the JPEG2000 standard, because the code data can be flexibly edited at the code level, the code data can be rearranged before the next display request is received. For example, after a plurality of images obtained by cutting a rectangular portion is displayed, there is a high possibility that a request for performing resolution scaling and displaying the image in the region is received. In this case, the code data can be configured such that the subcode data required for resolution scaling display can be easily cut out.

As described above, according to the second embodiment, to display a thumbnail image and a processed image, corresponding subcode data is extracted, and the subcode data is decoded and reproduced.

Figure 9:
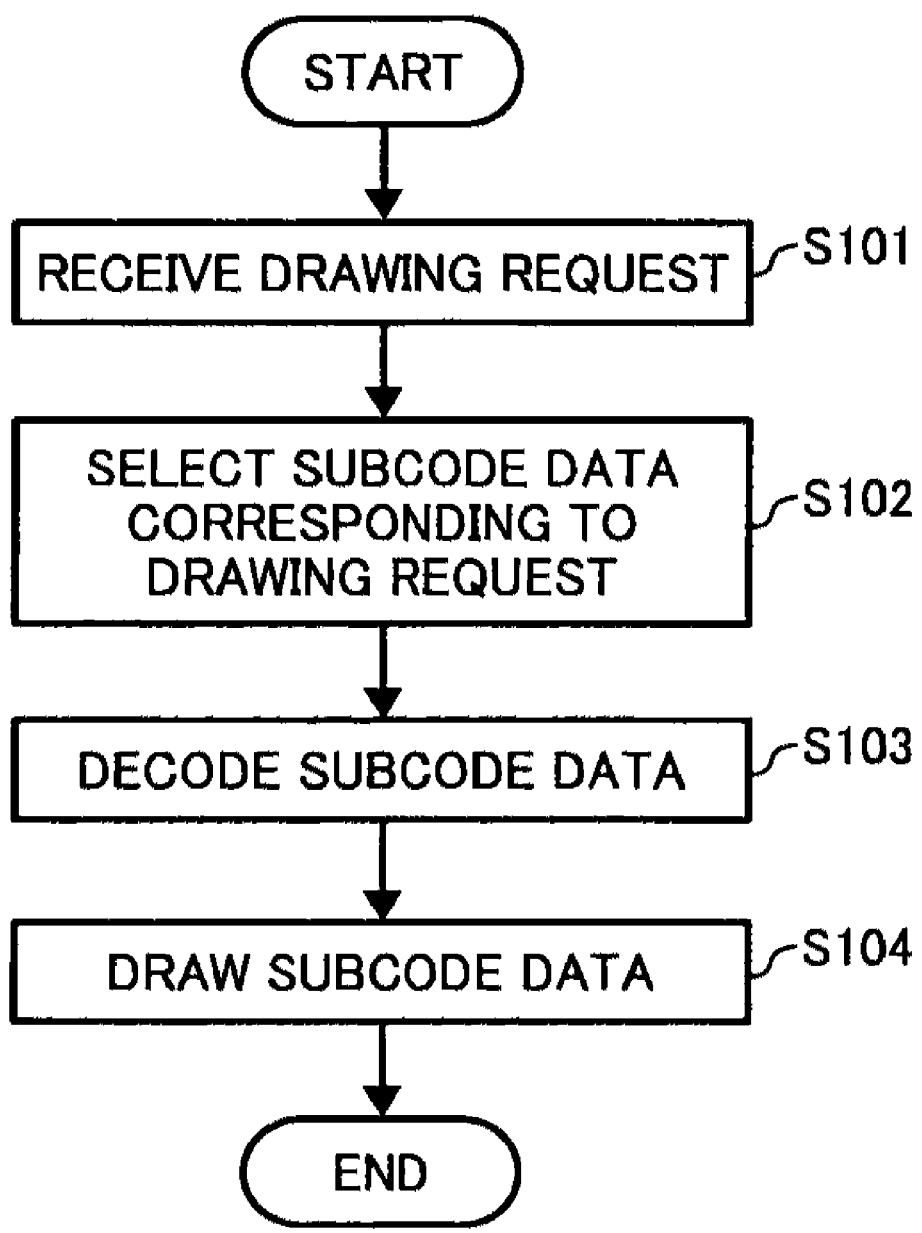
FIG. 9 is a flowchart of a display process performed on the operation panel.

FIG. 9 is a flowchart of a display process performed on the operation panel. As shown in FIG. 9, upon receipt of a drawing request, subcode data corresponding to the drawing request is selected (Steps S101 and S102). The selected subcode data is decoded and drawn (Steps S103 and S104).

Figure 10:
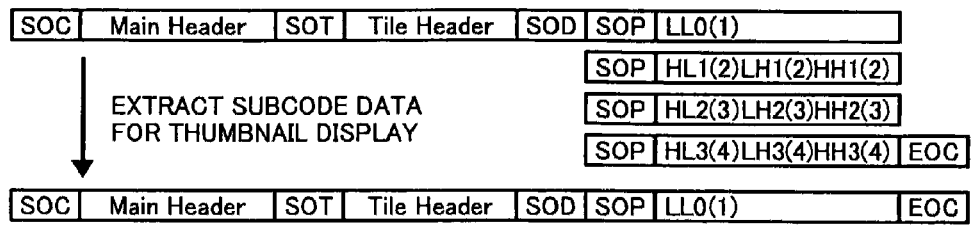
FIG. 10 is a schematic diagram for explaining extraction of subcode data for a thumbnail display image.
Figure 11:
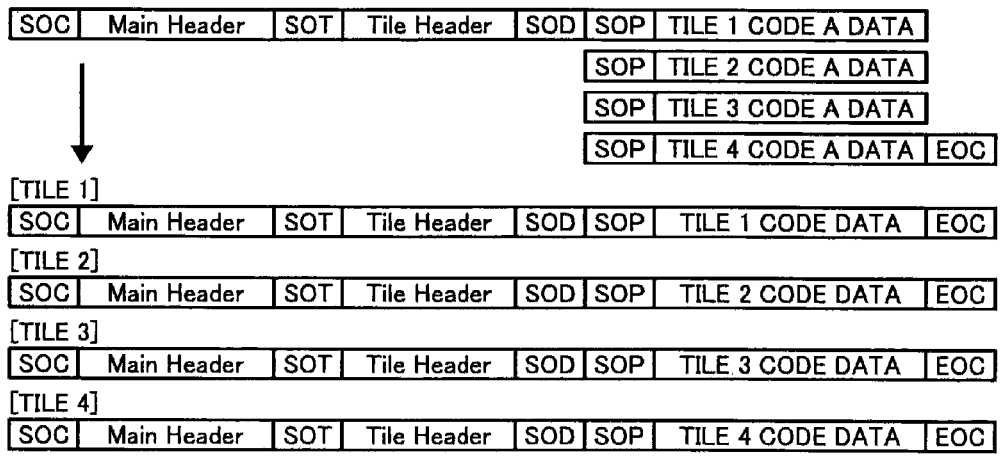
FIG. 11 is a schematic diagram for explaining extraction of subcode data for cutting out and displaying an image in a rectangular area.
Figure 12:
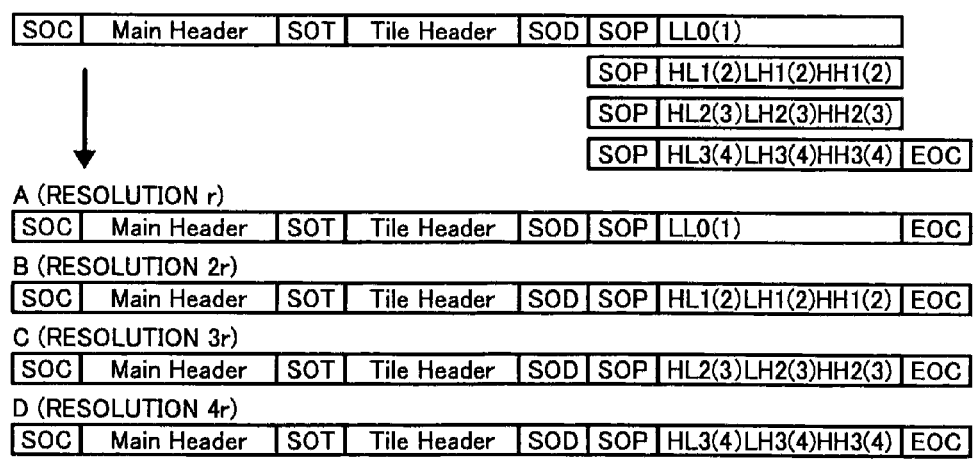
FIG. 12 is a schematic diagram for explaining extraction of subcode data for resolution scaling.

FIG. 10 is a schematic diagram for explaining extraction of subcode data for a thumbnail display image. FIG. 11 is a schematic diagram for explaining extraction of subcode data for cutting out and displaying an image in a rectangular area. FIG. 12 is a schematic diagram for explaining extraction of subcode data for resolution scaling. FIG. 13 is a schematic diagram for explaining extraction of part of code data. In the JPEG2000 encoding, wavelet transform is performed. Therefore, the subcode can be divided in unit of subband, and therefore, by decoding the code data of an LL component, a thumbnail image can be generated.

By cutting out the subcode data to realize the image processing, the storage capacity of the work memory required for displaying the thumbnail image and the preview image or processing and displaying the image on the operation panel of the copier or the MFP can be reduced, thereby enabling cost reduction. Further, a process for image processing and display can be simplified, thereby enabling to improve processing efficiency.

Multi-object encoding is explained next. A code format can be multi-object encoding. However, in the case of an image having the multi-object configuration, not only a large storage capacity is required, but also because the throughput is large, the waiting time for display is long. Therefore, one object is selected, and decoded and reproduced as the thumbnail image. As the thumbnail image as shown in FIG. 4A, an outline of the original scan image data needs only to be ascertained, and the outline of the original image can be ascertained from only one object.

Figure 14:
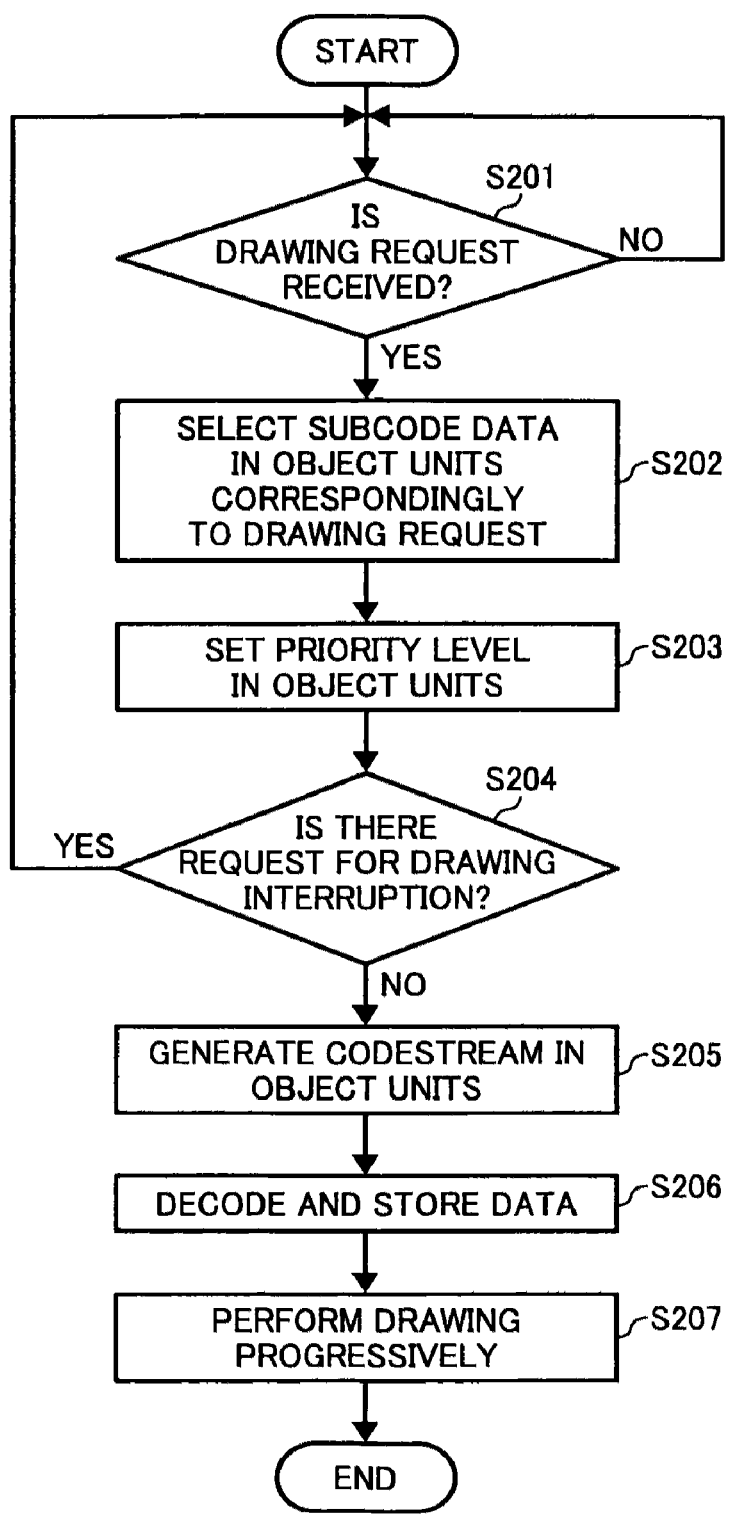
FIG. 14 is a flowchart of a progressive display control process of a multi-object code.

FIG. 14 is a flowchart of a progressive display control process of a multi-object code. As shown in FIG. 14, when a drawing request is received (YES at Step S201), subcode data is selected in object units correspondingly to the drawing request (Step S202). A priority level in object units is set (Step S203). Thereafter, it is determined whether there is a request for drawing interruption. When there is no interruption request (NO at Step S204), a codestream is generated in object units (Step S205). The data is then decoded and stored to perform drawing progressively (Steps S206 and S207). Thus, an object is selected based on the priority level of the corresponding multi-object configuration in object units, and part or all of the code data is decoded and reproduced.

Figure 15:
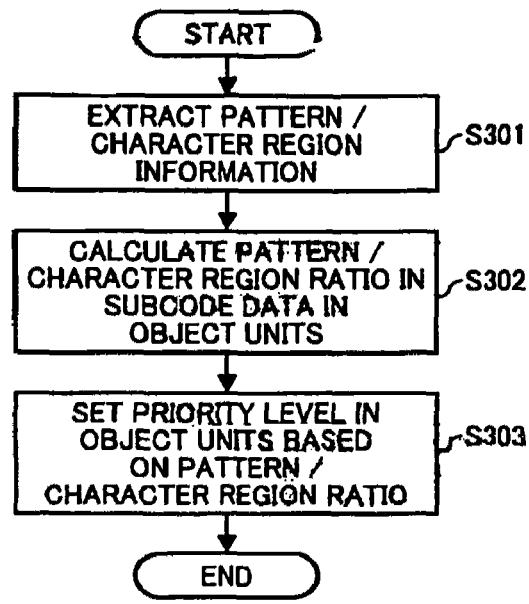
FIG. 15 is a flowchart of a process of setting priority level in object units.

FIG. 15 is a flowchart of a process of setting priority level in object units. First, pattern/character region information is extracted to calculate a pattern/character region ratio in subcode data in object units (Step S301 and S302). The priority level in object units is set based on the pattern/character region ratio (Step S303). A scanner in the copier generally includes a function of identifying an image area for each attribute of the image, at the time of scanning the image. Although not shown, the character/pattern ratio can be calculated by using the information. In the multi-object encoding, an object including a character and an object including a pattern are exclusively generated. Therefore, by selecting and reproducing an object including many image attributes, an overall outline can be ascertained.

Figure 16:
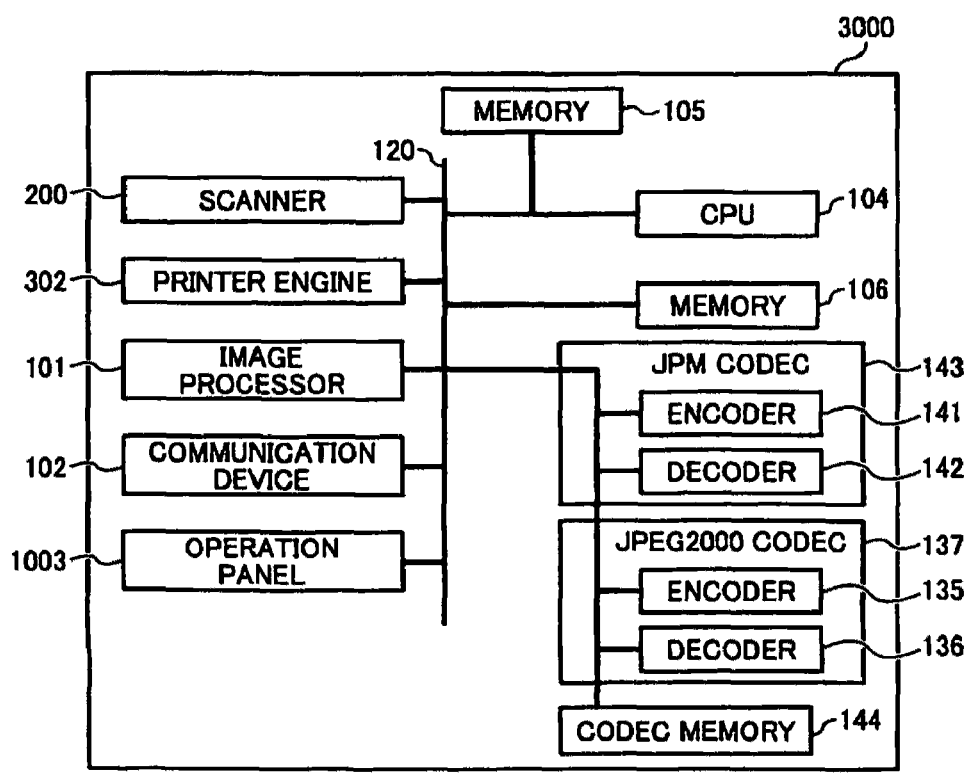
FIG. 16 is a functional block diagram of an image processing apparatus according to a third embodiment of the present invention.
Figure 17:
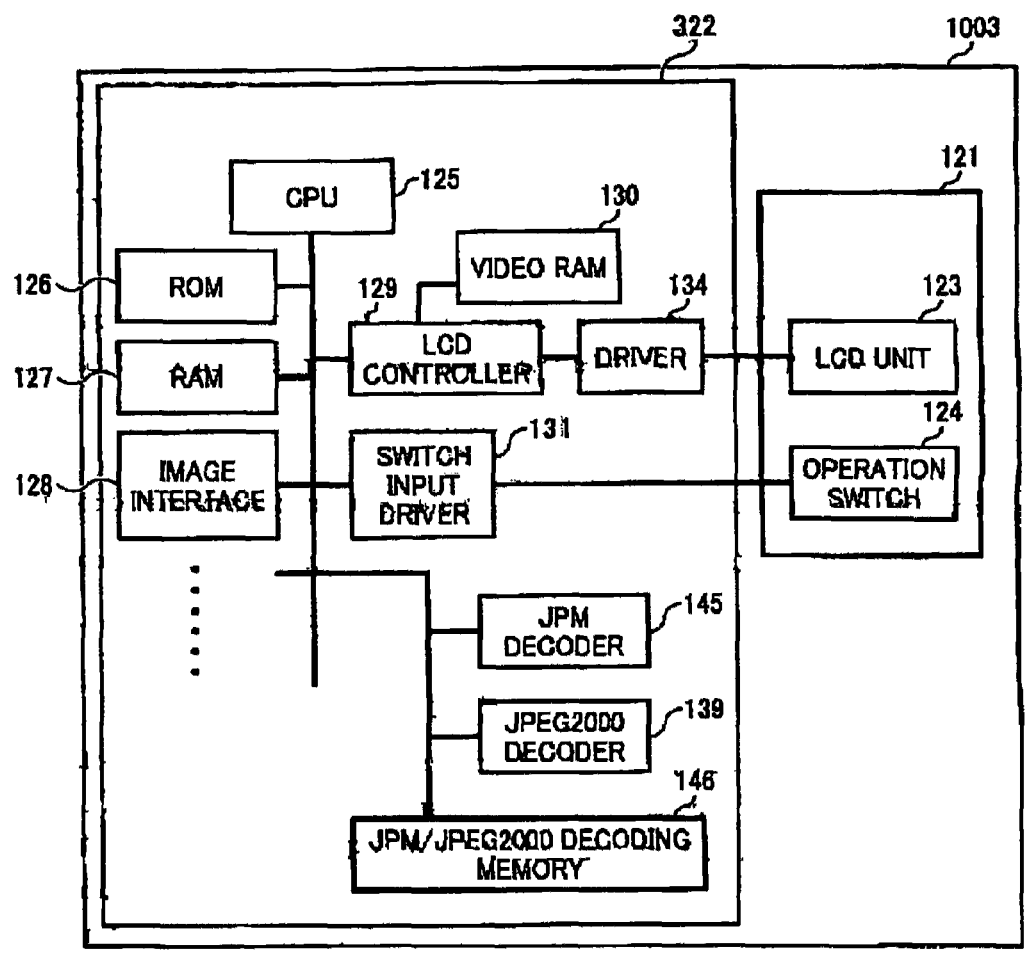
FIG. 17 is a functional block diagram of an operation panel shown in FIG. 16.

FIG. 16 is a functional block diagram of an image processing apparatus 3000 according to a third embodiment of the present invention. The image processing apparatus 3000 is of basically similar in configuration to the image processing apparatus 2000 except for a JPM (JPEG2000 Multi Page) codec 143, a codec memory 144, and the operation panel 1003. The JPM codec 143 includes a JPM encoder 141 and a JPM decoder 142. As shown in FIG. 17, the operation panel 1003 includes a control circuit 322 including a JPM decoder 145, and a JPM/JPEG2000 decoding memory.

Figure 18:
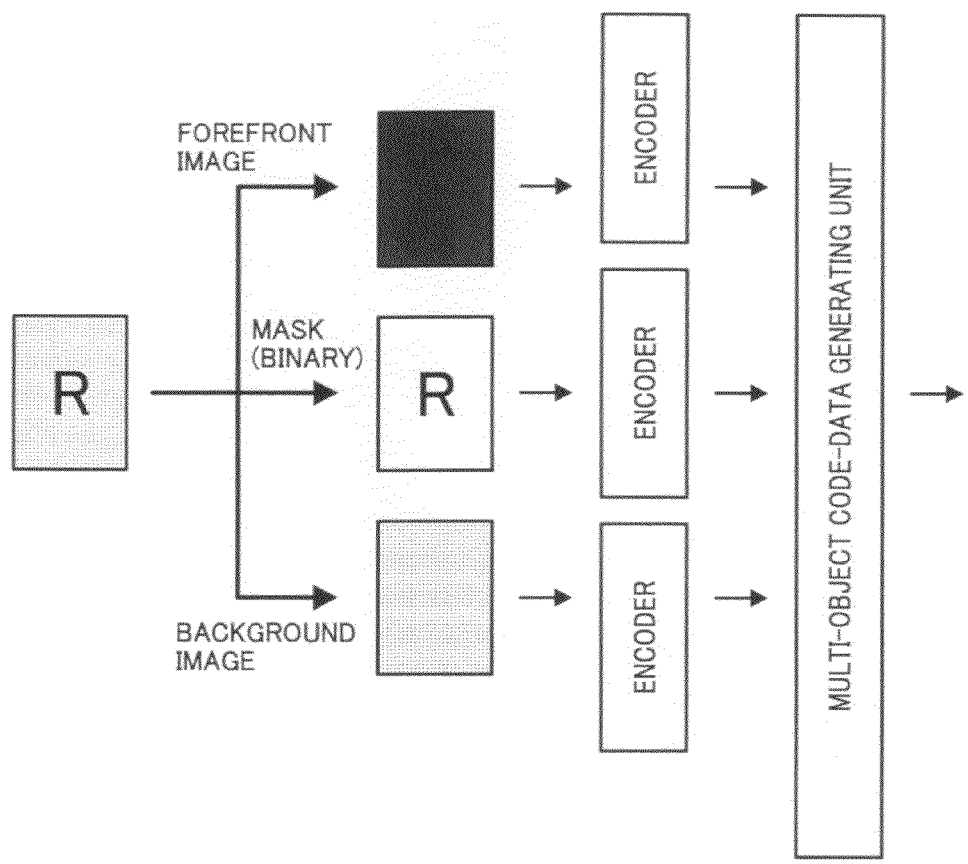
FIG. 18 is a schematic diagram for explaining generation of code data having a multi-object configuration.

Image reproduction based on the JPM specification is explained next. In the multi-object encoding, an input image (a document image in which a character and an image are present) is separated into a plurality of image data, and appropriate encoding is performed for respective data. The separated image data is referred herein to as an object, and image data including a plurality of objects is referred to as multi-object data. For example, in FIG. 18, the input image is separated into a foreground image, a background image, and a mask data. Generally, the mask image is expressed by binary data expressing either forefront or background, and in a pixel area in which a mask value is 1, the forefront image is reproduced, and in a pixel area in which the mask value is 0, the background image is reproduced. The mask image is separated so that either the forefront image or the background image is selected according to the mask image being 0 or 1. On the other hand, the forefront image or the background image is generally expressed by multivalued data. In the example of FIG. 18, the foreground image, the background image, and the mask data, which are respective objects, are encoded independently from each other, to form multi-object encoded code data.

Figure 19:
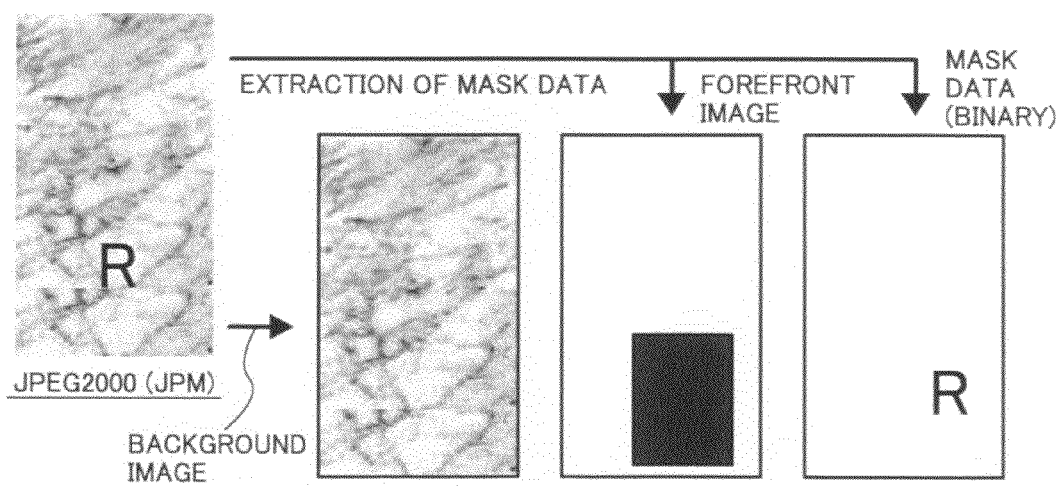
FIG. 19 is a schematic diagram for explaining a concept of a method for extracting mask data and foreground data.

FIG. 19 is a conceptual diagram for explaining a method for extracting the mask data and the foreground data. As shown in FIG. 19, a character in the original image data has a color and a pattern (gradation), which is separated into the binary mask data and the foreground image data such as color and pattern (gradation). The mask data can be calculated by using character area information extracted by a known area-attribute determining unit for image information (document image in which a character and an image are present).

Figure 20:
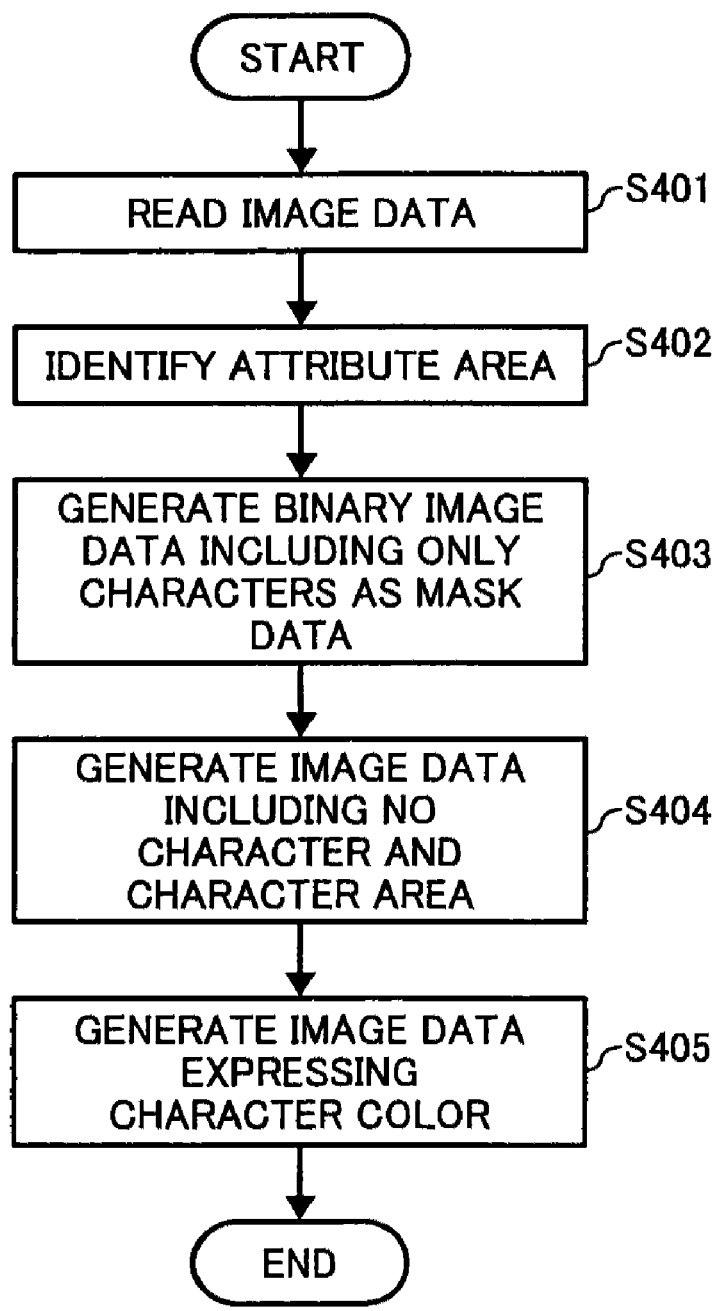
FIG. 20 is a flowchart of a process of generating separated image data.

FIG. 20 is a flowchart of a process of generating separated image data. As shown in FIG. 20, image data is read (Step S401), and an attribute area in the image is identified by, for example, the area-attribute determining unit (Step S402). Binary image data including only characters is generated as mask data (Step S403), and image data including no character and character area is generated (Step S404). Then, image data expressing the character color is generated (Step S405). In this manner, in a typical example, not only the mask data and the foreground image but also the background image data are generated simultaneously, by using a result of area determination of the character area with respect to the input image. Accordingly, the data is separated as an independent image data for each object and encoded, and as shown in FIG. 18, the multi-object encoding is performed.

Figure 21:
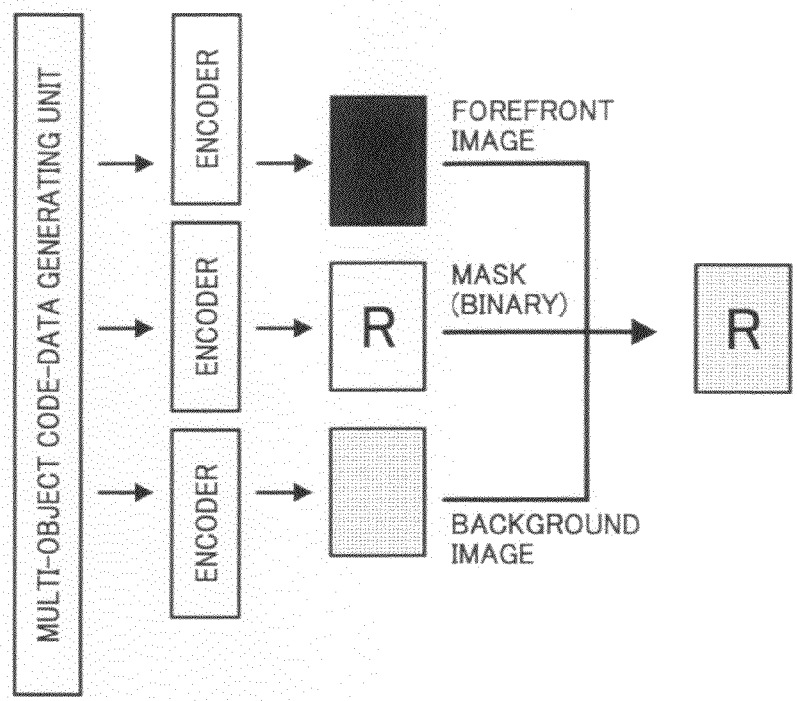
FIG. 21 is a schematic diagram for explaining decoding of code data having a multi-object configuration.

On the other hand, in reproduction of the image data, as shown in FIG. 21, after the respective encoded objects are decoded and the image data for each object is reproduced, a synthesizing process is performed to reproduce the original image. The synthesizing process corresponds to a separation method of the image for each object. There is JPEG2000 Part 6 (JPM) (ISO/IEC FDIS 15444-6) as one of the multi-object encoding.

The following equation explains a realization method by JPM. The equation indicates an image reproduction method. Page image in the equation indicates the reproduced image. In decomposition of the image data by JPM, the image data is decomposed into Base Image data corresponding to the background image, the mask data described as $M_m$, and image data (on the mask) described as $I_m$ corresponding to the foreground image.

$$\text{Page Image}_0[c][x, y] = \text{Base Image}[c][x, y]$$

$$\text{Page Image}_m[c][x, y] = \frac{(S_m - M_m[x, y]) \times \text{Page Image}_{m-1}[c][x, y] + M_m[x, y] \times I_m[c][x, y]}{S_m}$$

$$\text{Page Image}[c][x, y] = \text{Page Image}_n[c][x, y]$$

where $M_m$ is a pixel value of Mask Object in the mth Layout Object, $I_m$ is a pixel value of Image Object in the mth Layout Object, c is a component, x, y are a coordinates of the image, $S_m$ is the maximum value (power of 2) of $M_m$ (mask), and n is the number of Layout Objects included in the page.

An adaptation example of the JPM is represented as follows:

$$\text{Page Image}_0 = [c][x, y] = \text{BACKGROUND IMAGE}[c][x, y]$$

$$\text{Page Image}_1 = [c][x, y] = \frac{(1 - M_1[x, y]) \times \text{Page Image}_0[c][x, y] + M_1[x, y] \times \text{FOREGROUND IMAGE}[c][x, y]}{1}$$

$$\text{Page Image}[c][x, y] = \text{Page Image}_1[c][x, y]$$

According to the specification of the JPM, the mask data ($M_m$) expresses opacity of the image data ($I_m$); however, in the typical example explained with reference to FIG. 21, the value of the mask data is limited to 1 or 0 as explained above. In this example, the image data is decomposed into the Base Image data as the background image data, and the mask data ($M_m$) and image data ($I_m$) with a configuration having only one pair of data. As another decomposition example of the original image data, the Base Image data is decomposed as transparent data to create background image data. The image data is reproduced by performing the synthesizing process based on these equations.

Portable document format (PDF) is also a file format encoded into the code data having the multi-object configuration, and therefore the PDF can be used as well. The PDF is recently updated to allow the JPEG2000 codestream, and an object forming the PDF file format can be encoded according to the JPEG2000.

Extraction of the character area by the area-attribute determining unit is performed by performing a binarization process (binarized-image generating process) with respect to the entire image data and analyzing a binarization result. In the binarized-image generating process, a red-green-blue (RGB) signal input in unit of block is converted to a Y signal, which is a luminance signal. Conversion from the RGB signal to the Y signal can be performed by various methods, and is not particularly limited. As one example of the simplest conversion methods, a conversion equation adopted in the JPEG2000 is as follows:

$$Y=(R+2\times G+B+2)/4$$

The converted Y signal is binarized according to a threshold determined for each block. As a threshold determining method here, there can be considered, for example, a method of utilizing a statistical property such as average and dispersion by taking a histogram as disclosed in Japanese Patent Application Laid-open No. 2002-77631, and as a simple method, a method of using a mean value of the luminance (Y) value of all pixels in a block, or a method of determining the threshold by calculating a predetermined weight with respect to the mean value.

The binarization process is not limited to the above specific calculation methods, and the threshold can be determined by respective RGB signals without performing the Y-signal conversion, to perform the binarization process.

Figure 24A:
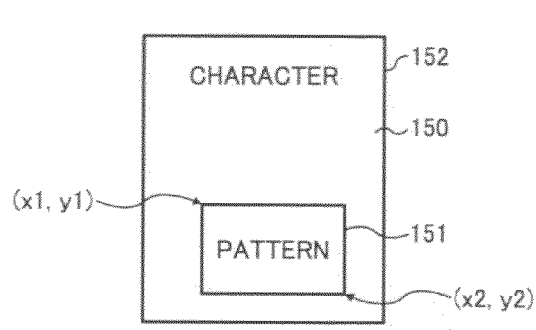
FIG. 24A and 24B are schematic diagrams for explaining calculation of a text/pattern ratio.
Figure 24B:
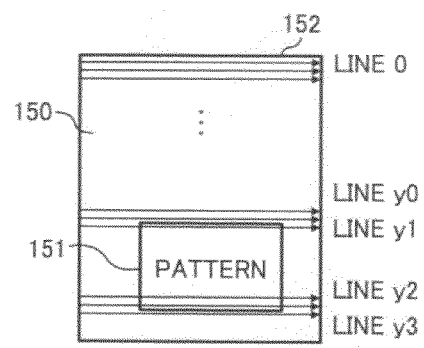

In a character-area extraction process, the character area is extracted from the binarized image data obtained by the binarized-image generating process. This is a technique frequently used in an optical character recognition (OCR) process, and for example, as disclosed in Japanese Patent Application Laid-open No. 2002-77631, edge following of black pixels in the binarized image data is performed to perform labeling with respect to all the black pixels, and only a group of black pixels having vertical and lateral widths equal to or smaller than a threshold is extracted as a character, thereby extracting the character area. Further, the user can set the character area by specifying an area directly, without using the method of analyzing the image data as described above. As another example, an edge-area detection circuit and a white area detection circuit are provided, to which document image data is respectively input, and based on detection results of these detection circuits, it is determined whether an area to be processed in the document image data is a character area or a pattern area, thereby determining an image (separate an image area). A text/pattern ratio can be calculated by checking a ratio between text and pattern included in the original document image data, using the area-attribute determining unit. Typically, the number of text and pattern areas is added up, while scanning the image data and performing area attribute determination for each small area of the image, thereby calculating the ratio based on the total value. For example, in the case of processing document image data of a simple document 152, as shown in FIG. 24A, in which a character area 150 and a pattern area 151 are present together, the document image data is divided into a plurality of raster lines y0, y1, . . . , as shown in FIG. 24B, and the number of text and pattern areas is counted respectively for each raster line. Other than this method, there are several methods for setting a priority level of the objects.

Figure 22:
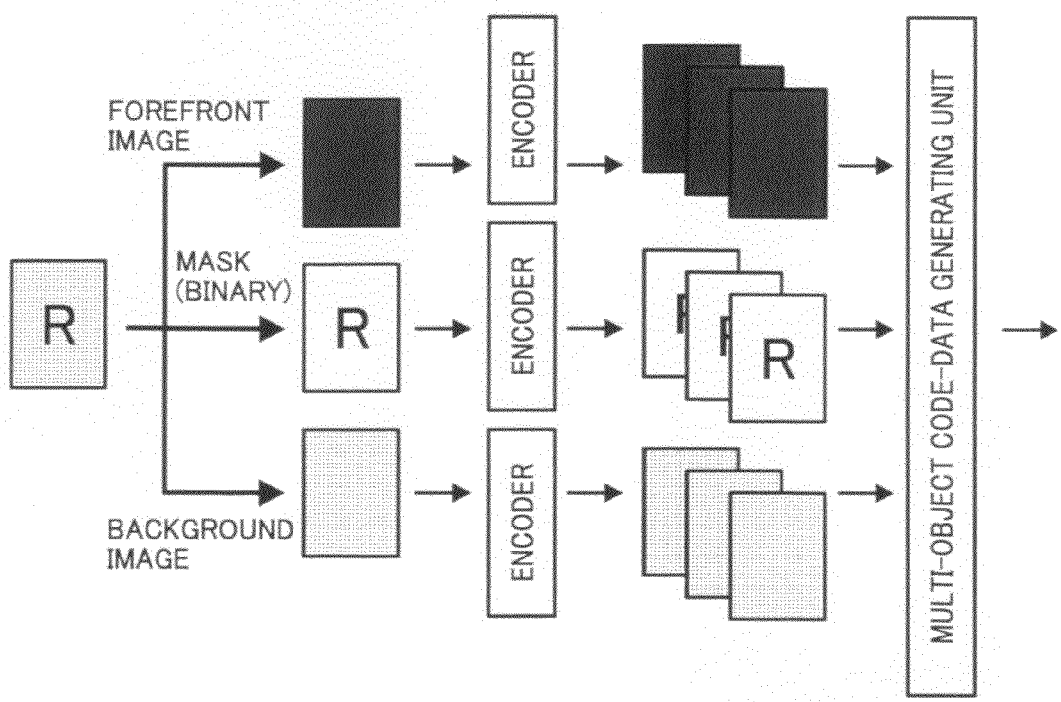
FIG. 22 is a schematic diagram for explaining scalable encoding of code data having a multi-object configuration.
Figure 23:
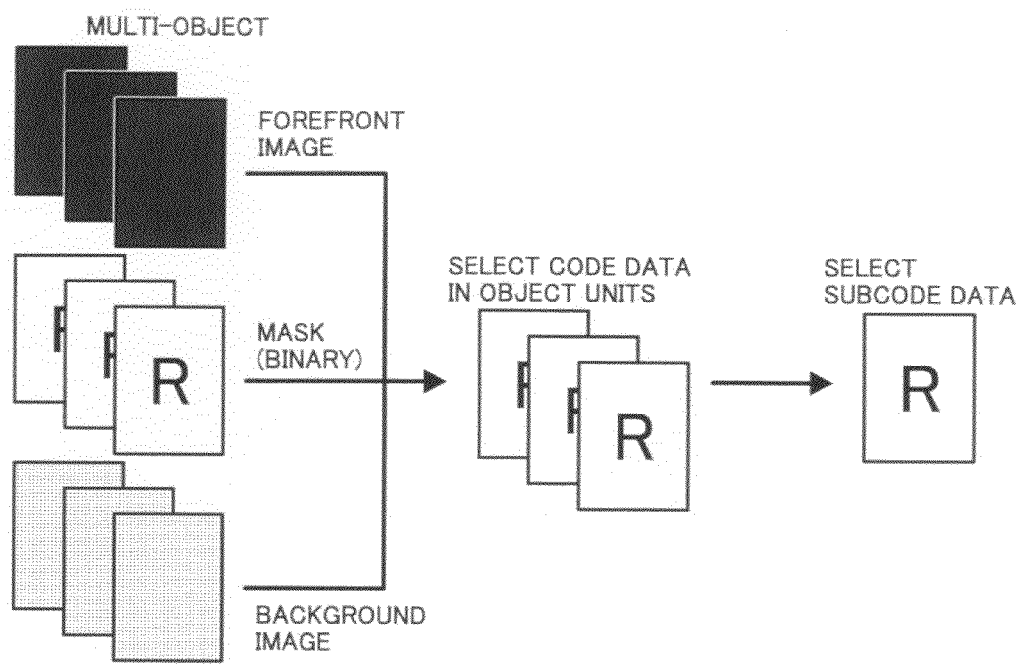
FIG. 23 is a schematic diagram for explaining synthesizing of code data having a multi-object configuration.

FIG. 22 is a schematic diagram for explaining scalable encoding of code data having a multi-object configuration. Typically, it indicates a case that all objects are encoded according to the JPEG2000 standard. In such a case, when code data of the object is selected, as shown in FIG. 23, there can be a case that all code data of the objects are selected, and a case that the subcode data of the code data of the objects is extracted and reproduced by using a characteristic that the scalable encoding is performed.

An analysis of the text/pattern ratio is explained next. The text/pattern ratio can be calculated by checking a ratio between text and pattern included in the original document image data, using the area-attribute determining unit. Typically, the number of text and pattern areas is added up, while scanning the image data and performing area attribute determination for each small area of the image, thereby calculating the ratio based on the total value. For example, in the case of processing document image data of a simple document 152, as shown in FIG. 24A, in which a character area 150 and a pattern area 151 are present together, the document image data is divided into a plurality of raster lines y0, y1, . . . , as shown in FIG. 24B, and the number of text and pattern areas is counted respectively for each raster line. Other than this method, there are some methods for setting a priority level of the objects.

A process of displaying preview progressively is explained next. In a process requiring display time, the user has to wait for the display for a long time. According to another embodiment of the present invention, therefore, the entire display process is not performed at a time, but is divided into a plurality of processes. With this, progressive display control is performed so that display can be obtained even in the middle of the process, which reduces stress on the user. By realizing the progressive display, the user can see the display at an early stage (time), and therefore the user is not frustrated while being waiting.

FIG. 25 is examples of progressive preview display. As shown in FIG. 25, the resolution and display size are increased with passage of time. A unit to be displayed progressively is determined according to discrete units of the subcode data of the code data. As explained above, because the code data can be divided into small units according to the JPEG2000 standard, a JPEG2000 codec is used. FIG. 26 is a schematic diagram for explaining typical patterns of progressive preview display. Type 1 indicates a case that reproduction is performed for each image area. Typically, by displaying an important area first, the user can see the important area at an early stage. Type 2 indicates a case that progressive display is performed such that the accuracy of image quality is gradually improved, although the display range is not changed. It can be realized by sequentially decoding and reproducing the subcode data forming one code data. In the multi-object encoding, as shown in FIG. 23, decoding and reproduction can be performed in object units, or decoding and reproduction can be performed progressively in unit of subcode data constituting the object. Particularly, because a display time is required as seen in the display of a multi-object image, progressive display in object units becomes effective. In any case, it is important to preferentially decode and reproduce important subcode data so that the outline of the display can be ascertained at an early stage.

Figure 27:
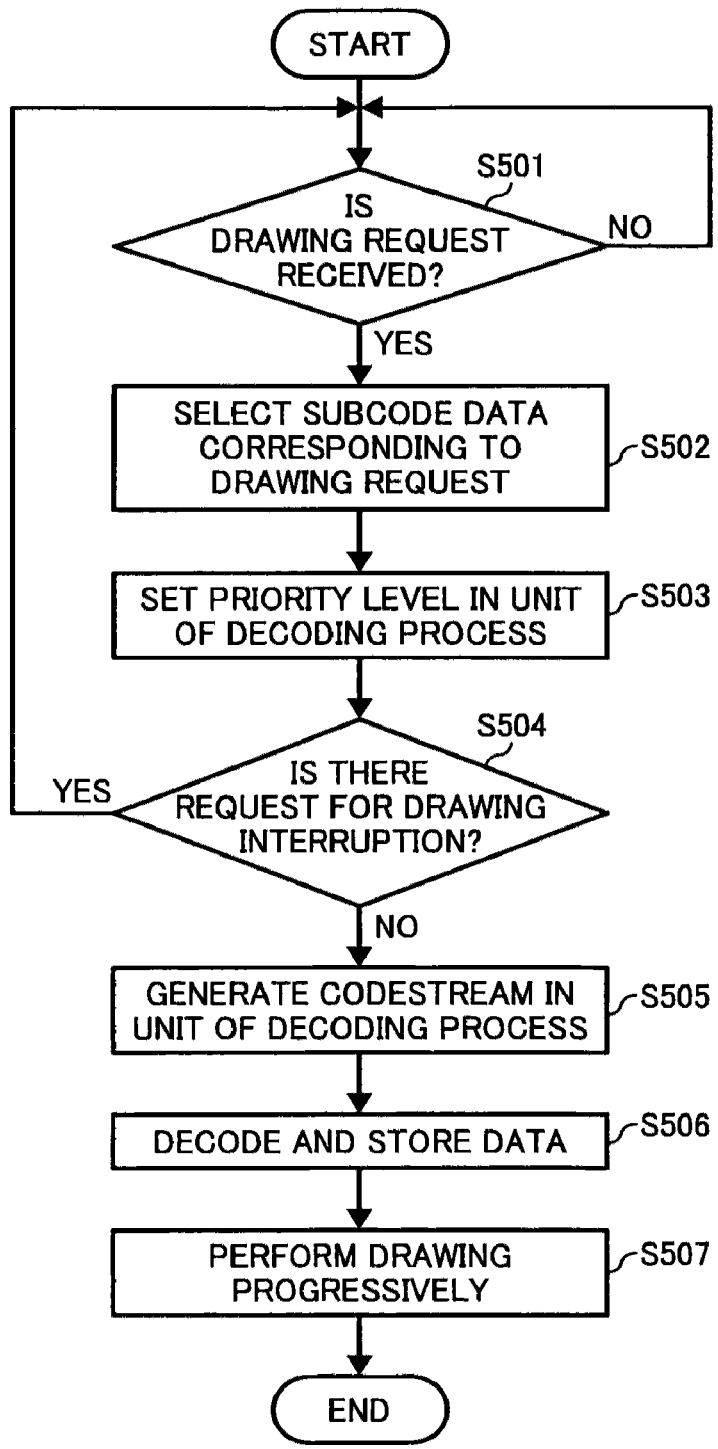
FIG. 27 is a flowchart of another progressive display control process.

FIG. 27 is a flowchart of another progressive display control process. As shown in FIG. 27, when a drawing request is received (YES at Step S501), code data corresponding to the drawing request is selected (Step S502). A priority level in unit of decoding process is set (Step S503). Thereafter, it is determined whether there is a request for drawing interruption. When there is no interruption request (NO at Step S504), a codestream is generated in unit of decoding process (Step S505). The data is then decoded and stored, to perform drawing progressively (Steps S506 and S507). Thus, the subcode data is divided in unit of decoding process, and added with the priority level. For example, when progressive display is performed according to type 1 in FIG. 26, it can be considered to give a higher priority level to a central part, which tends to be a target area, than to the peripheral part. In the encoding according to the JPEG2000, because the code data can be separated for each rectangular area (tile area) as shown in FIG. 11 or for each resolution as shown in FIG. 12, the subcode data is sequentially extracted to perform decoding and reproduction, thereby enabling to realize the progressive processing easily.

There are several methods for setting the priority level. When the priority level is selected in unit of object in the multi-object encoding, the priority between objects can be determined based on the character/pattern ratio in the original image as shown in FIG. 15.

Figure 28:
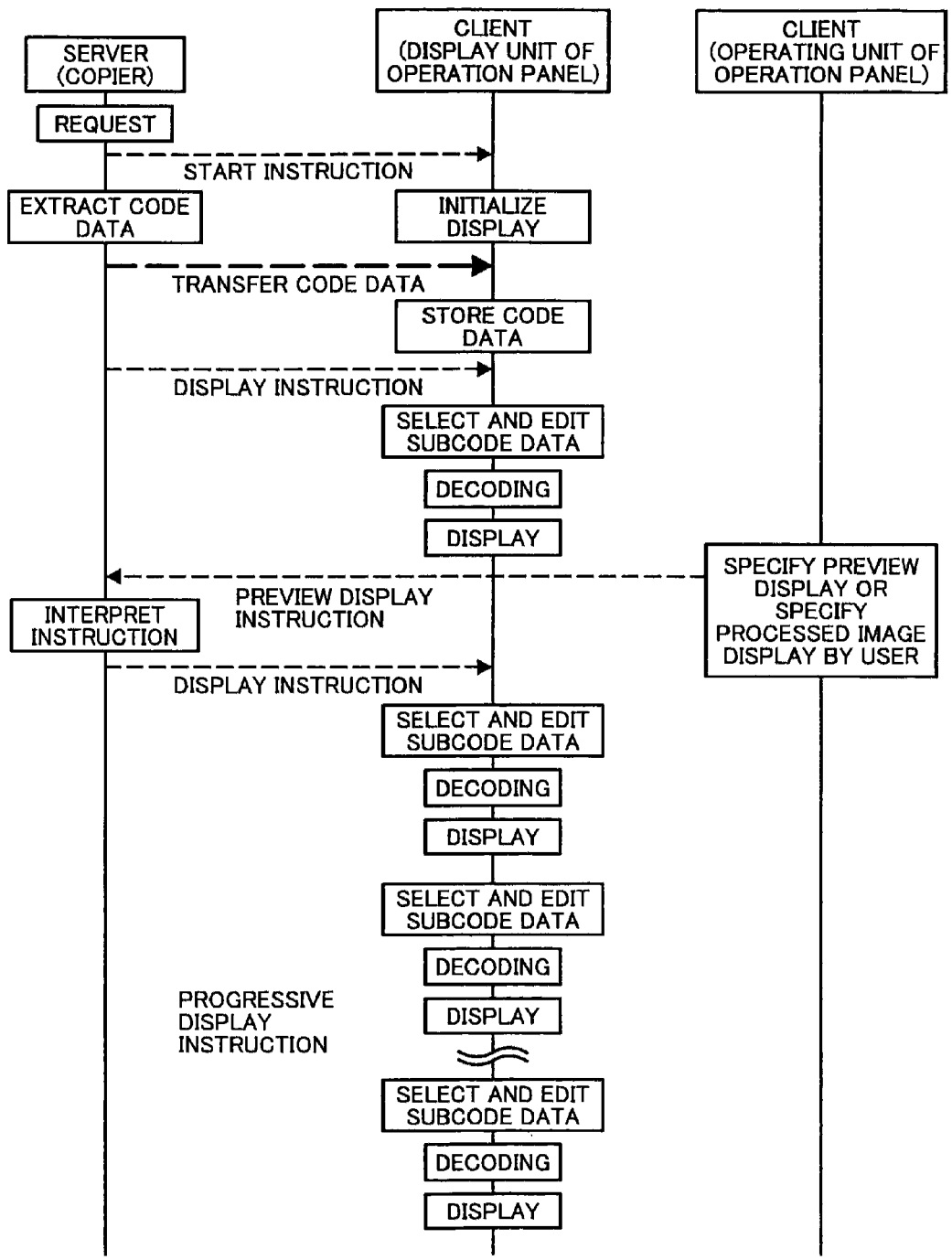
FIG. 28 is a sequence diagram of the progressive display process.

FIG. 28 is a sequence diagram of the progressive display process. The process shown in FIG. 28 is different from that of FIG. 8 in that display is performed progressively.

Explained below is progressive decoding and reproduction performed according to the JPEG2000 standard, in which information already decoded is reused, and data in the process of decoding is stored. FIG. 29 depicts a JPEG2000 codestream. As shown in FIG. 29, the code data generally includes a start sign at the top and an end sign at the end, to separate respective code data. The code data is added with a header, and code strings, which are the body of the code data, follow the header.

FIG. 30 is an example of code data including code strings referred to as packets. The code data according to the JPEG2000 specification has such a packet configuration. In this example, the packet constituting the code data includes 12 packets corresponding to four layers and three image areas (precinct unit).

Figures 32, 33:
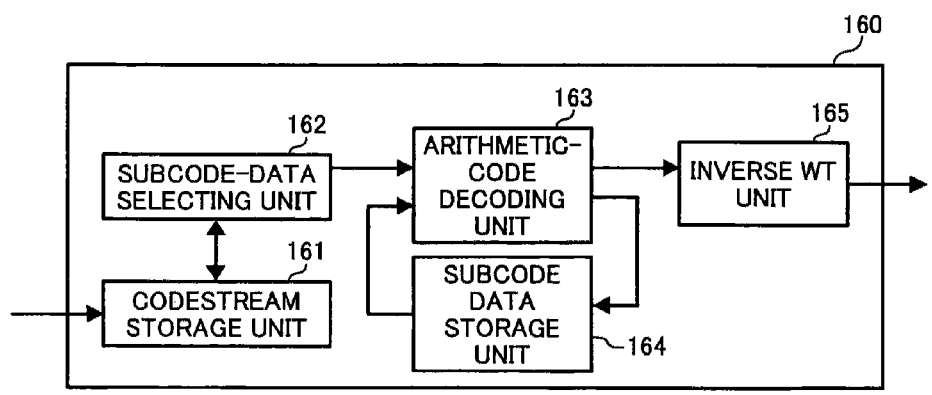

The codestream as shown in FIG. 31 or 32 is sequentially decoded progressively for each subcode data. The codestream can be arranged in element code data units for each area as shown in FIG. 31 or 32, or can be arranged in element code data units for each layer. For example, when output type information indicates a printer, a codestream arranged in the element code data units for each area is generated, decoded, and reproduced. On the other hand, when the output type information indicates a display unit, a codestream arranged in the element code data units for each layer is generated, decoded, and reproduced.

Figure 34:
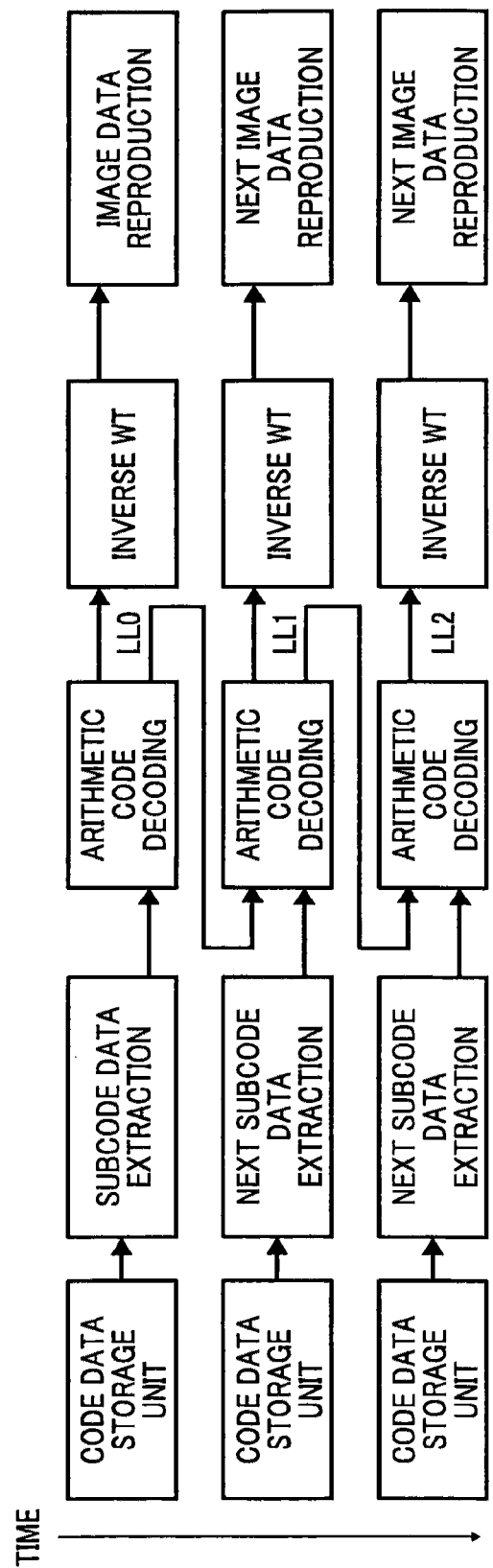
FIG. 34 is a schematic diagram for explaining progressive decoding.

FIG. 33 is a functional block diagram of a decoder 160 that performs progressive decoding. The decoder 160 includes a codestream storage unit 161, a subcode-data selecting unit 162, an arithmetic-code decoding unit 163, a subcode data storage unit 164, and an inverse wavelet transform (WT) unit 165, and performs decoding of JPEG2000 codestream. FIG. 34 is a schematic diagram for explaining progressive decoding. The codestream storage unit 161 stores a codestream to be processed. The subcode-data selecting unit 162 selects and extracts code data in order of from the top element code data. The arithmetic-code decoding unit 163 takes out the extracted element code data and subjects the element code data to arithmetic code decoding, thereby calculating WT coefficient data. The subcode data storage unit 164 is used when the data is decoded in unit of subcode data. The extracted WT coefficient data is written in the subcode data storage unit 164. The WT coefficient data is sequentially written and added in the subcode data storage unit 164 that stores the WT coefficient data. The inverse WT unit 165 performs inverse wavelet transform and reproduces the WT coefficient data. When the element code data in unit of layer is decoded, the WT coefficient data already stored in the subcode data storage unit 164 is used to perform inverse wavelet transform.

Figure 35:
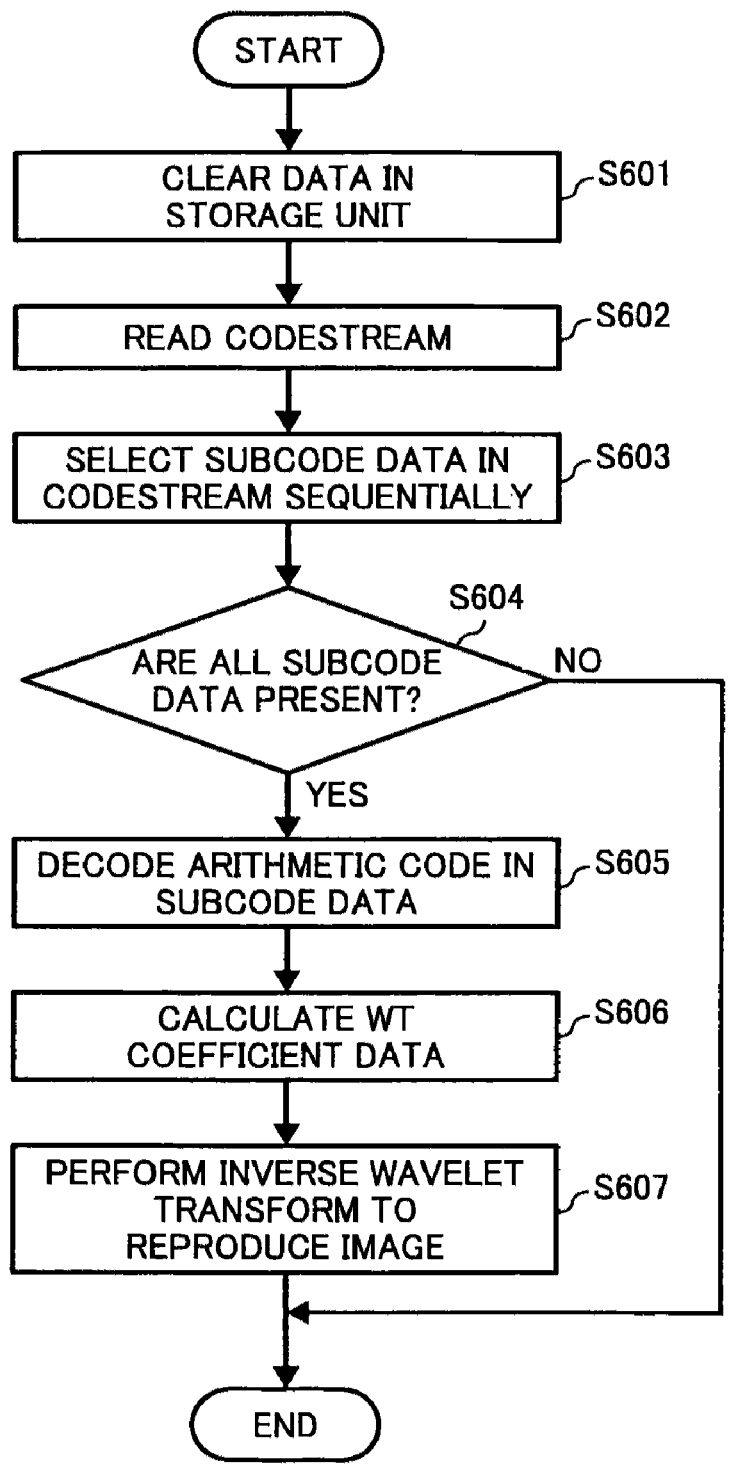
FIG. 35 is a flowchart of a procedure of progressive decoding.

A procedure of progressive decoding is explained next with reference to FIG. 35. As shown in FIG. 35, the data in the storage unit is cleared first (Step S601). The codestream is read (Step S602), and the subcode data is sequentially selected from the codestream (Step S603). It is determined whether all subcode data are present. When all subcode data are not present (NO at Step S604), the process ends. When all subcode data are present (Yes at Step S604), subcode data is subjected to arithmetic code decoding (Step S605) to calculate WT coefficient data (Step S606). In the case of the code data stream in unit of layer, WT coefficient data is calculated by using the WT coefficient data and partially stored WT coefficient data. The inverse wavelet transform is then performed to reproduce the image (Step S607). Although not described herein, a color image and discrete cosine transform (DCT) in JPEG2000 are processed in the same manner as above.

Figure 36:
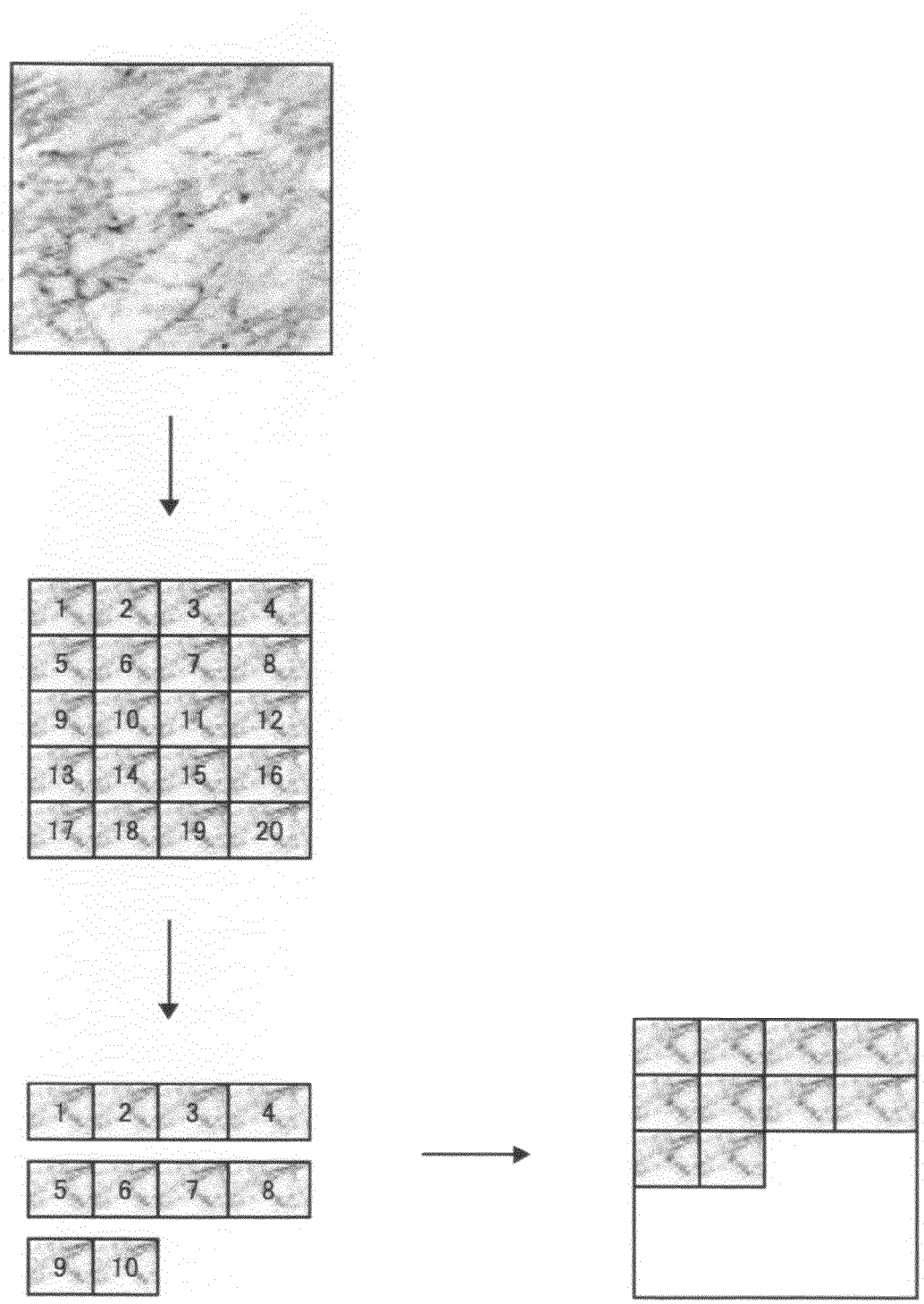
FIG. 36 is a schematic diagram for explaining a flow of code data in progressive process performed in unit of subcode data corresponding to an image area.
Figure 37:
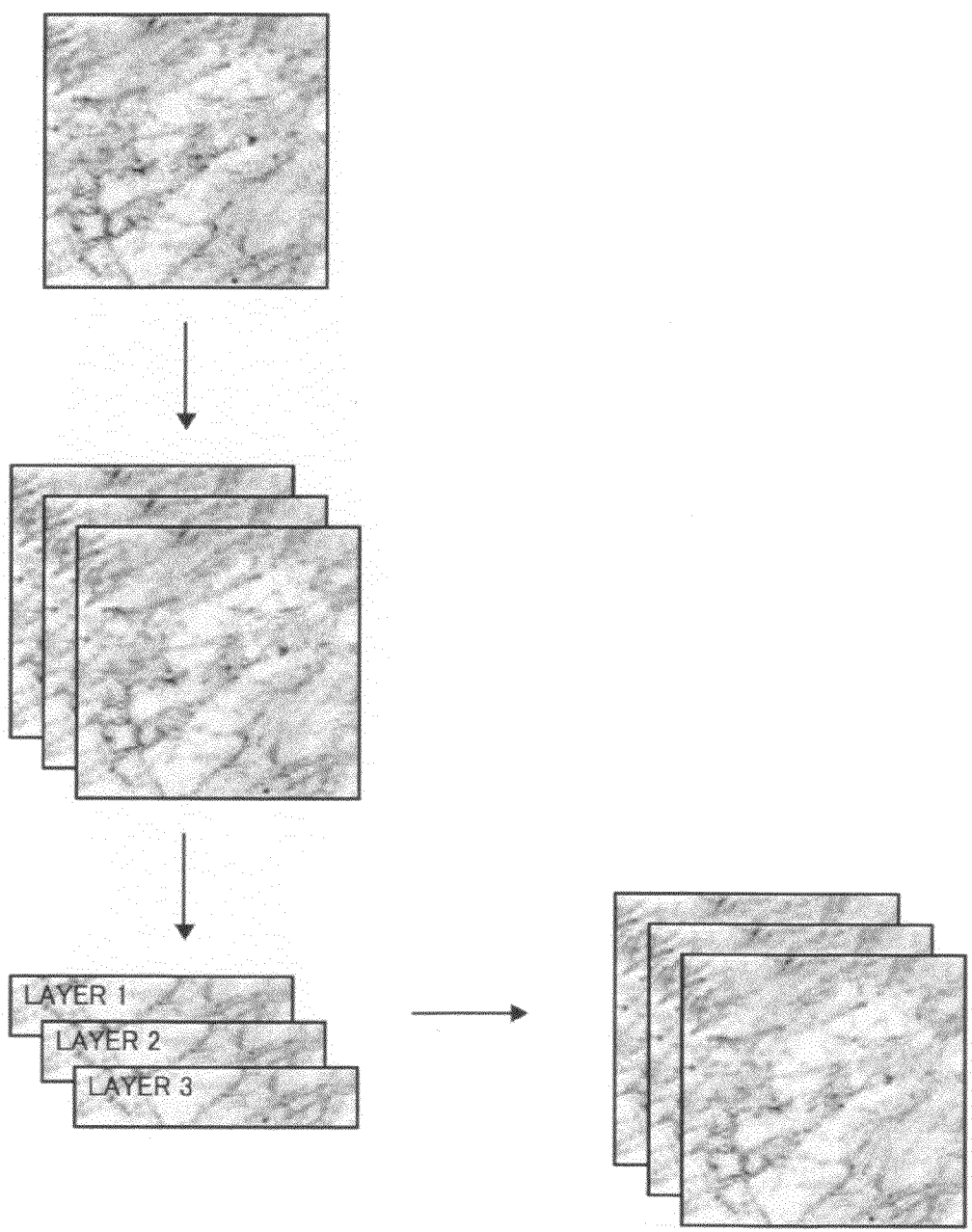
FIG. 37 is a schematic diagram for explaining a flow of code data in progressive process performed in unit of subcode data corresponding to a layer.

FIGS. 36 and 37 are schematic diagrams for explaining a flow of code data to be progressively processed. FIG. 36 depicts a flow of code data in progressive process performed in unit of subcode data corresponding to an image area. FIG. 37 depicts a flow of code data in progressive process performed in unit of subcode data corresponding to a layer. In the progressive process, a reproduction mode is different according to the configuration of the subcode data. In FIG. 36, the codestream is generated in unit of area easily dividable. On the other hand, in FIG. 37, the codestream is generated in unit of layer easily dividable. Because the JPEG2000 is a hierarchical code having a scalable configuration, the JPEG2000 can generate both codestreams or can convert a subcode data unit having one of the classifications into a subcode data unit having the other classification. The element code data forming the codestream is progressively decoded sequentially. As shown in FIG. 36, when the progressive process is performed in the subcode data unit corresponding to the image area, the data is sequentially decoded in unit of area and then sequentially reproduced in unit of area. In the printer, the data is reproduced in order of raster, which is the order of processing in the printer, thereby enabling to improve processing efficiency. On the other hand, as shown in FIG. 37, when the progressive process is performed in the subcode data unit corresponding to the layer, the data is sequentially decoded in unit of layer and then sequentially reproduced in unit of layer. In the display unit, detailed reproduction is performed gradually overall, and therefore the overall image can be known at an early stage.

A subcode data reference index is explained next. When the subcode data is selected and extracted, by pre-registering and extracting address information of the code data, search efficiency of the subcode data can be improved, thereby enabling to realize high-speed display.

Figures 38, 39:
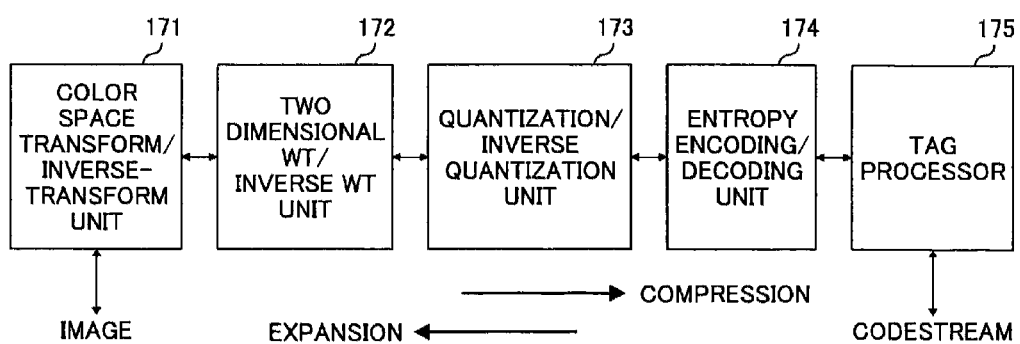
FIG. 38 is an example of contents of a delimiter information table of the subcode data.
FIG. 39 is a schematic diagram for explaining a hierarchical encoding algorithm, which is the basis of the JPEG2000.

FIG. 38 is an example of contents of a delimiter (separation) information table of the subcode data. As shown in FIG. 38, a correspondence between a subcode identification mark and a starting address at which the subcode data is stored in the code data is typically described. The delimiter information table is created before the code data is stored. When the JPEG2000 encoding is performed, because an arrangement pattern of the subcode data is determined beforehand as a progression order, the stored starting address can be easily calculated based on the pattern. A typical storage destination is a header of the code data. When the code data is generated, the table is created and stored in the header. The header is referred to when the subcode data is extracted.

Encoding according to the JPEG2000 is explained next.

In the standard specification of the JPEG2000, the code data is formed in such a format that the code data can be separated in unit of tile area or precinct area of the image area. The encoding according to the JPEG2000 (ISO/IEC 15444-1) standard is performed in a procedure described below.

The frame data of the interlace image is converted to data for each color component of Y, Cr, and Cb. A two-dimensional discrete wavelet transform (DWT) is performed with respect to the color data of the respective color component. A scalar quantization process specified in the JPEG2000 is then performed to a wavelet coefficient obtained. An entropy encoding process specified in the JPEG2000, that is, arithmetic coding process by so-called coefficient modeling is performed with respect to the scalar quantized data. After the processes from the two-dimensional DWT to the entropy encoding process have been performed to all color data, a code string specified in the JPEG2000 is generated. The decoding process is performed in a reversed way. These processes can be realized by a hardware circuit. In this case, high speed processing can be realized. Note that there already exists an image processing apparatus that realizes all the encoding processes conforming to the JPEG2000 by the hardware circuit.

Figure 41:
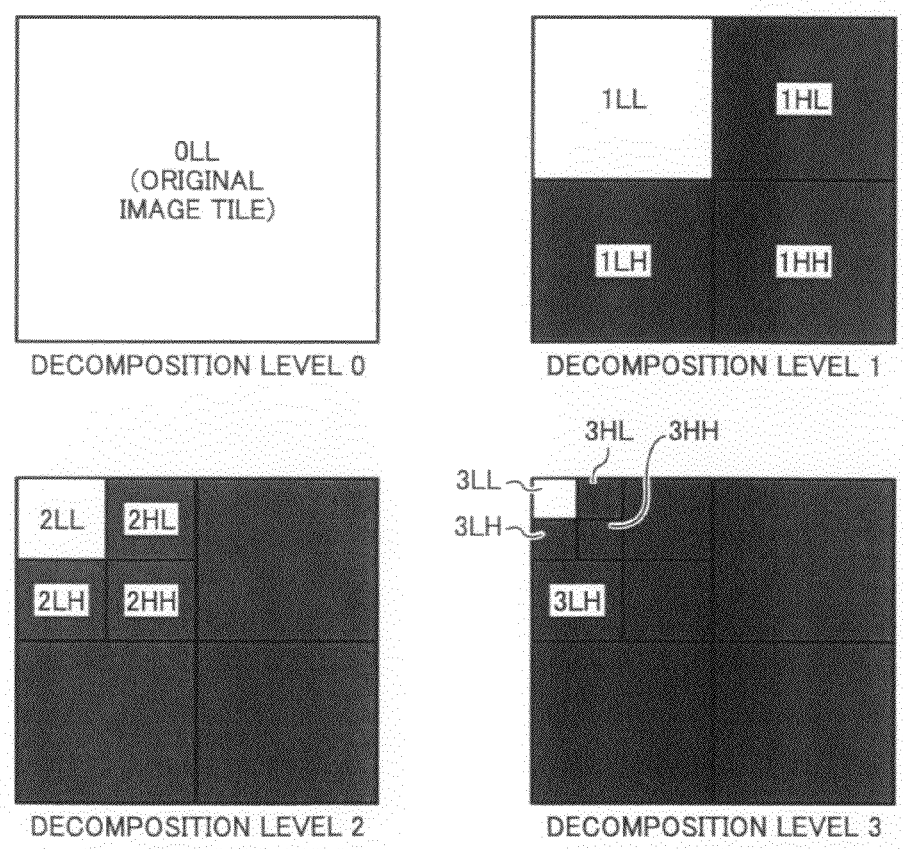
FIG. 41 is a schematic diagram for explaining decomposition levels and subbands.

FIG. 39 is a schematic diagram for explaining a hierarchical encoding algorithm, which is the basis of the JPEG2000. As shown in FIG. 39, a hierarchical encoding/decoding unit includes a color space transform/inverse-transform unit 171, a two-dimensional WT/inverse WT unit 172, a quantization/inverse quantization unit 173, an entropy encoding/decoding unit 174, and a tag processor 175. A transform method is one of the largest points of difference as compared with the JPEG algorithm. DCT is used in the JPEG algorithm, while DWT is used in the hierarchical encoding compression/expansion algorithm. It is one of the reasons why the DWT is adopted in the JPEG2000, which is a successor algorithm of the JPEG, that DWT has excellent image quality in a highly compressed domain as compared with DCT. Another point of difference is that a functional block referred to as the tag processor 175 is added in the hierarchical encoding algorithm to form a code in the final stage. In this unit, compressed data is generated as a codestream at the time of compression, and the codestream required for expansion is interpreted at the time of expansion. In the JPEG2000, various convenient functions can be realized by the codestream. For example, as shown in FIG. 41, in an arbitrary hierarchy (decomposition level) corresponding to octave division in the DWT on a block basis, compression and expansion operation of a still image can be freely suspended.

A color space transform unit is frequently connected to an input/output portion of the original image. For example, a portion that performs transform from RGB color co-ordinates including respective components of R (red)/G (green)/B (blue) as a fundamental color system or a YMC color system including respective components of Y (yellow)/M (magenta)/C (cyan) as a complementary color system to a YUV or YCbCr color system, or inverse transform corresponds thereto.

The JPEG2000 algorithm is explained below.

Figure 40:
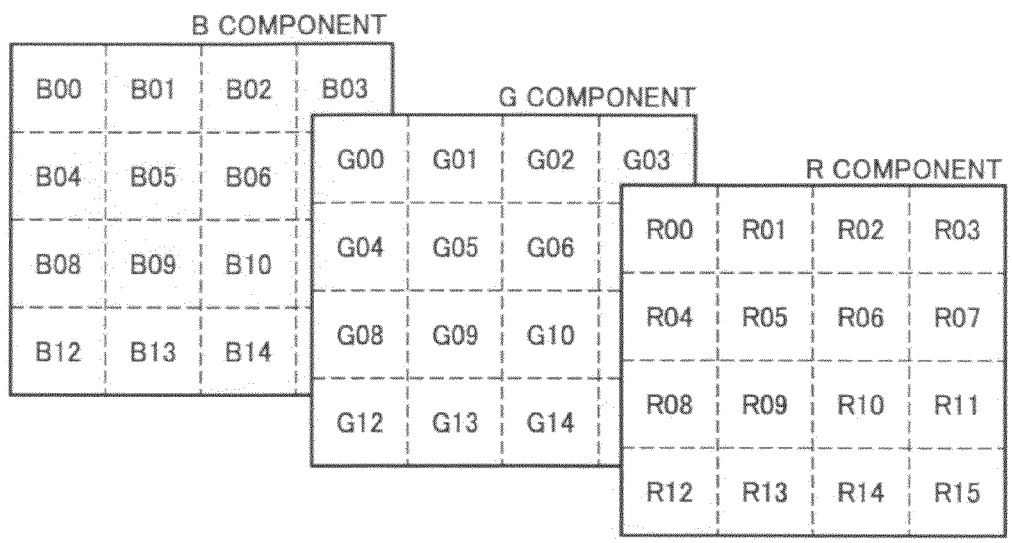
FIG. 40 is a schematic diagram for explaining basis of tile separation.

In a color image, as shown in FIG. 40, respective components (here, RGB fundamental color system) of the original image are generally divided by a rectangular area (tile). Individual tiles, for example, R00, R01, R15/G00, G01, . . . , G15/B00, B01, . . . , B15 become base units at the time of executing the compression and expansion process. Therefore, the compression and expansion process is performed independently for each component and for each tile.

At the time of encoding, respective tile data of respective components is input to the color space transform/inverse-transform unit 171, where the data is subjected to color space transform, and then two-dimensional wavelet transform (normal transform) is applied thereto by the two-dimensional WT/inverse WT unit 172, so that the data is space-divided into frequency bands.

FIG. 41 depicts subbands at a plurality of (e.g., three) decomposition levels. That is, the two-dimensional wavelet transform is applied to an original image tile (0LL) (decomposition level 0) obtained by tile division of the original image to separate subbands (1LL, 1HL, 1LH, 1HH) shown in decomposition level 1. Subsequently, the two-dimensional wavelet transform is applied to a low frequency component 1LL in this hierarchy, to separate subbands (2LL, 2HL, 2LH, 2HH) shown in decomposition level 2. Sequentially in the same manner, the two-dimensional wavelet transform is applied to a low frequency component 2LL, to separate subbands (3LL, 3HL, 3LH, 3HH) shown in decomposition level 3. In FIG. 41, the subband to be encoded in each decomposition level is expressed in gray. For example, when the number of decomposition levels is three, the subbands (3LL, 3HL, 3LH, 3HH, 2LL, 2HL, 2LH, 2HH, 1LL, 1HL, 1LH, 1HH) shown in gray are encoding targets, and the subband 3LL is not encoded.

Figure 42:
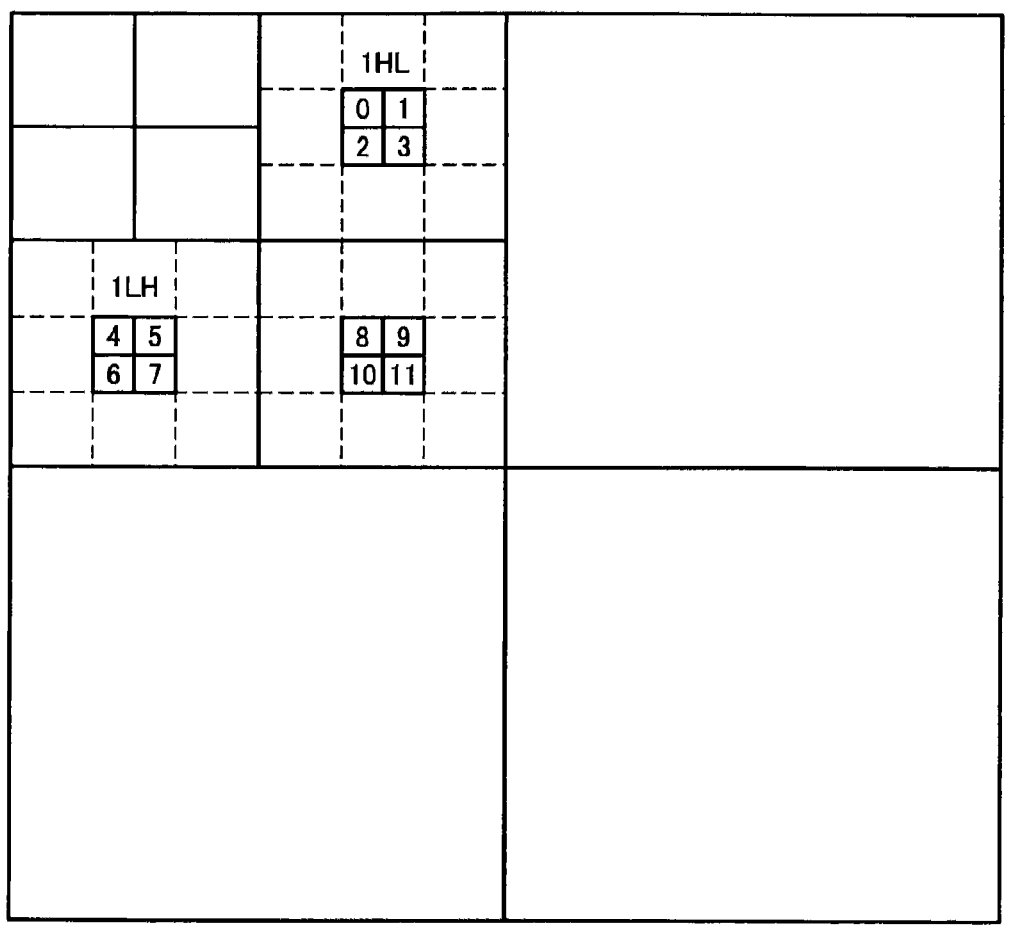
FIG. 42 is a schematic diagram of a precinct and a code block.

A bit to be encoded is determined in a specified encoding order, and the quantization/inverse quantization unit 173 generates a context from peripheral bits of a target bit. A wavelet coefficient having subjected to the quantization process is divided into rectangles referred to as "precinct", which do not overlap on each other, for each individual subband. This is introduced to efficiently use the memory in implementation. As shown in FIG. 42, one precinct includes three rectangular areas spatially agreeing with each other. Further, the individual precinct is divided into rectangular "code blocks" that do not overlap on each other. This becomes a basic unit at the time of performing entropy encoding.

The entropy encoding/decoding unit 174 performs encoding with respect to each component tile based on probability estimation from the context and the target bit. In this manner, all components in the original image are encoded in tile units. The minimum unit of code data formed by the entropy encoding/decoding unit 174 is referred to as a packet. As shown in FIG. 43, the packet is sequenced in a progressive order, which is indicated by one of image header segments. Aggregation of all packets in the precinct forms a part of a code of the entire area of an image (for example, a code from the most significant bit (MSB) of the wavelet coefficient to the third bit plane in the entire area of the image), which is referred to as a layer. The layer is a part of a bit plane code of the entire image, and the image quality is improved with an increase in the number of layers to be decoded. Aggregation of all layers forms a code of all the bit planes in the entire area of the image.

Figure 44:
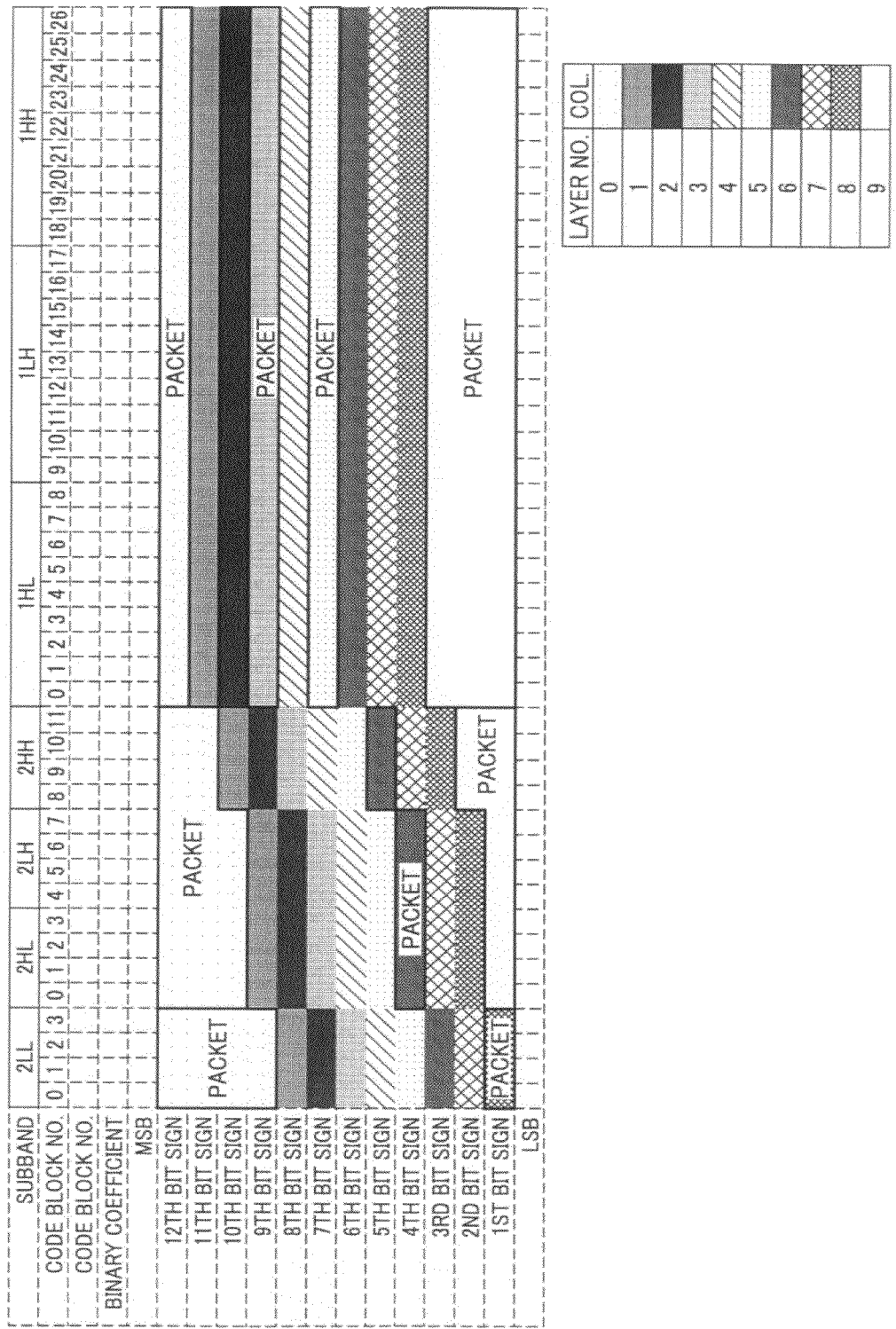
FIG. 44 is a schematic diagram for explaining a relation between a layer and a packet when a subband is designated as a precinct in a bit-plane encoding of the entire area of an image.

FIG. 44 depicts a relation between the layer and the packet when a subband is designated as a precinct in a bit-plane encoding of the entire area of an image. In this example, the number of hierarchies of the wavelet coefficient (the decomposition level) is 2, and the subband at the decomposition level 2 is divided into four code blocks and the subband at the decomposition level 1 is divided into nine code blocks, respectively. The packet includes some precincts as a unit of precinct, and in the example of FIG. 44, because the precinct is the subband, the packet spans over from some subbands HL to HH.

The packet is progressive order data, and is arranged according to the area, resolution, layer and color component. That is, according to the JPEG2000 standard, by changing the priority level of four image elements, that is, image quality (layer (L)), resolution (R), component (C), and position (precinct (P)), four progression types described below are defined.

LRCP progression: decoding is performed in order of from precinct, component, resolution level, and layer, and therefore the image quality of the entire face of the image is improved as an index of the layer progresses, thereby enabling to realize progression of the image quality. It is also referred to as layer progression.

RLCP progression: decoding is performed in order of from precinct, component, layer, and resolution level, and therefore progression of resolution can be realized.

RPCL progression: decoding is performed in order of from layer, component, precinct, and resolution level, which is progression of resolution as in RLCP. However, the priority of a specific position can be increased.

PCRL progression: decoding is performed in order of from layer, resolution level, component, and precinct, and therefore decoding of a specific part comes first and progression of a spatial position can be realized.

CPRL progression: decoding is performed in order of from layer, resolution level, precinct, and component, and therefore, for example, at the time of progressive decoding of a color image, progression of the component can be realized such that a gray image is reproduced first.

Thus, in the JPEG2000 standard, the image is divided into area (image component such as tile or precinct), resolution, hierarchy (layer), and color component, which are independently encoded as a packet, respectively. These packets can be identified and extracted without performing decoding.

Figure 45A:
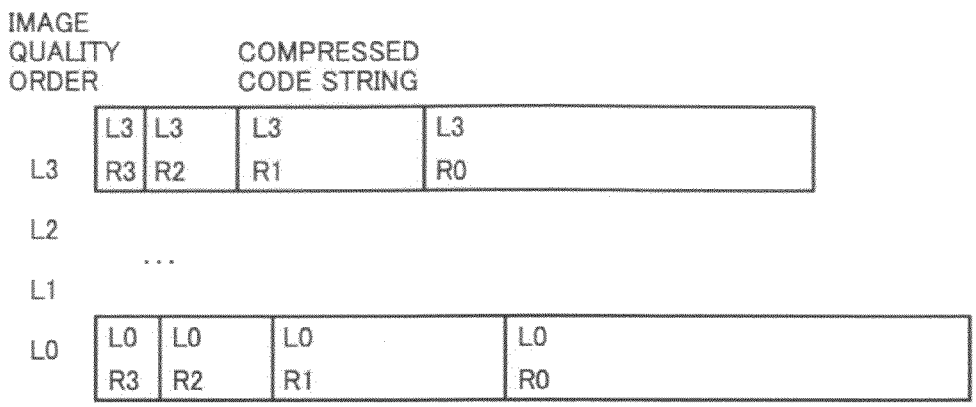
FIGS. 45A and 45B are schematic diagrams for explaining a process for controlling progressive sequence.
Figure 45B:
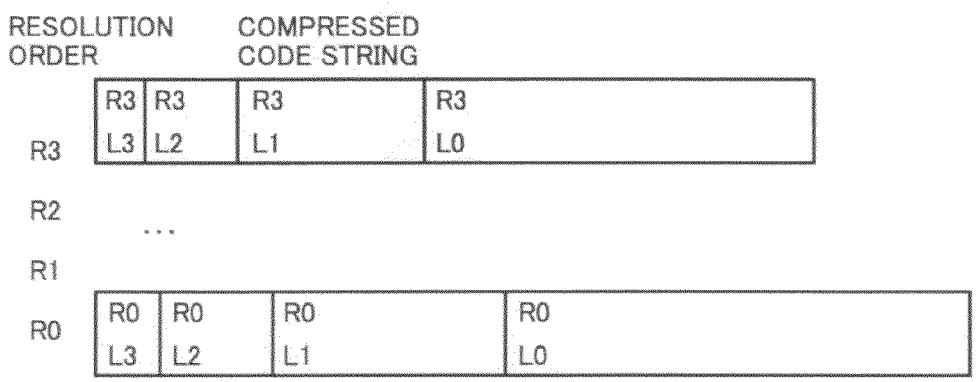

FIG. 45A is a schematic diagrams of a progressive sequence of LR progression (layer progression). FIG. 45B is a schematic diagrams of a progressive sequence of RL progression (resolution progression).

Figure 46:
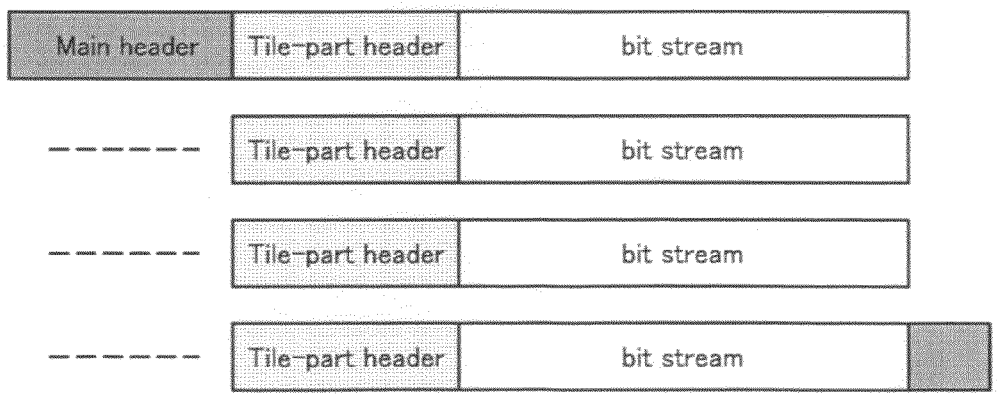
FIG. 46 is a schematic diagram for explaining a structure of codestream.

The tag processor 175 couples all the encoded data from the entropy encoding/decoding unit 174 in one codestream, and adds a tag thereto. FIG. 46 depicts a structure of the codestream. Tag information referred to as header is added to the head of the codestream and the heads of partial tiles forming each tile, which are followed by encoded data of each tile. The tag is positioned again at the end of the codestream.

On the other hand, at the time of decoding, image data is generated from the codestream of each tile in each component, contrary to the encoding. This is explained briefly with reference to FIG. 39. In this case, the tag processor 175 interprets the tag information added to the codestream input from outside, and decomposes the codestream into a codestream of each tile in each component. The entropy encoding/decoding unit 174 performs the decoding process for each codestream of each tile in each component. A position of a bit to be decoded is determined according to a sequence based on the tag information in the codestream, and the quantization/inverse quantization unit 173 generates a context from the sequence of peripheral bits (already decoded) of a target bit position. The entropy encoding/decoding unit 174 performs decoding based on probability estimation from the context and the codestream, generates the target bit, and writes it at the target bit position. Because the data decoded in this manner is spatially divided for each frequency band, the two-dimensional WT/inverse WT unit 172 performs the two-dimensional wavelet transform, thereby decoding each tile in each component of the image data. The decoded data is transformed to the original color system data.

A JPEG2000 codestream format is explained next.

The JPEG2000 codestream includes all entropy-encoded data of the image and data describing a method to be used for decoding the encoded data. The codestream includes information of the wavelet transform to be used, tile size, precinct size, information of resolution, and sequence of packets in a file. The codestream needs include all parameters required for decoding the entropy-encoded data to an image sample. The codestream can include information for providing high-speed access to a part of the encoded data, for example, packet length.

Figure 47:
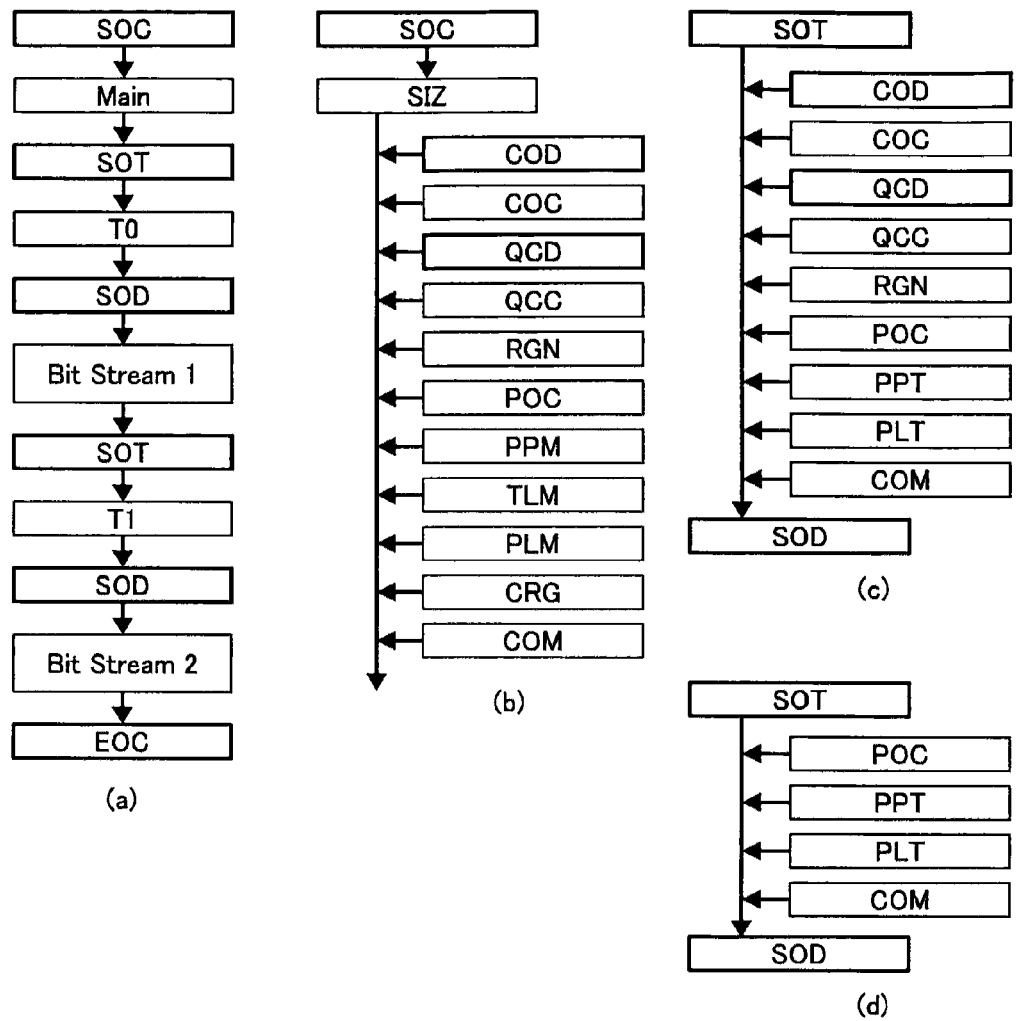
FIGS. 47A to 47D are schematic diagrams for explaining a JPEG2000 codestream format and a configuration of a main header.

FIG. 47A depicts a schematic configuration of the JPEG2000 codestream format. In the JPEG2000 "codestream" includes some marker segments. The marker segment includes one marker having 2-byte length and a parameter group attached thereto. Function, application, and data length are expressed in respective marker segments. The codestream format starts with a Start of Codestream (SOC) marker indicating beginning of the code data. The SOC marker is followed by a main header in which an encoding parameter and a quantization parameter are described, and then by actual code data.

FIG. 47B depicts a schematic configuration of the main header. The main header includes essential marker segments of COD and QCD, and option marker segments of COC, QCC, RGN, POC, PPM, TLM, PLM, CRG, and COM. Image information such as the number of components and the tile size when the image is not compressed is described in a SIZ marker segment, and includes width and height of the image component. The COD and COC marker segments include a parameter indicating how the compressed data is to be decoded. In the COD marker, progression sequence, number of layers, precinct size, and number of decompositions are described. Information relating to quantization is described in the QCD marker. The COM marker is used when it is desired to add information such as a comment, and can be used both in the main header and a tile header. The main header is followed by a series of "tile parts". Each tile part starts with an "SOT" marker segment for identifying specific tile and part. The encoded data for each tile part is preceded by the "SOT" marker segment. The "SOT" marker segment includes information of the number of tile parts.

Figure 48:
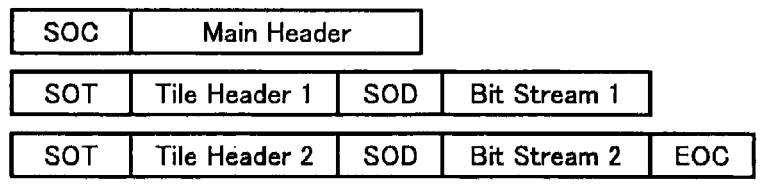
FIG. 48 is examples of JPEG2000 codestream.

The actual code data as shown in FIG. 48 starts with Start of Tile-part (SOT) marker, and includes tile header, Start of data (SOD) marker, and tile data (code). End of Codestream (EOC) indicating end of code is added after the code data corresponding to the entire image. The main header includes the essential marker segments of COD and QCD, and option marker segments of COC, QCC, RGN, POC, PPM, TLM, PLM, CRG, and COM.

The tile header configuration shown in FIG. 47C depicts a marker segment string added to the head of the tile data, and marker segments of COD, COC, QCD, QCC, RGN, POC, PPT, PLT, and COM can be used. On the other hand, FIG. 47D depicts a marker segment string added to the head of the divided tile part when the tile is divided into a plurality of numbers, and marker segments of POC, PPT, PLT, COM can be used. The tile header does not include the essential marker segment, and all the marker segments are optional. The tile data (code) includes continuous packets. The sequence of packets in the codestream is referred to as the progression sequence.

With the above configurations, the number of layers of respective hierarchies constituting the hierarchical code data such as the number of components, the number of layers, the precinct size, and the number of decompositions can be known by analyzing the JPEG2000 code format. Also, the progression order or the like can be known.

As set forth hereinabove, according to an embodiment of the present invention, the storage capacity of a work memory required for processing and displaying an image can be reduced, resulting in less cost.

Moreover, it is possible to reproduce an image with different resolution as well as to reproduce a partial image without processing the image data only by selectively decoding and reproducing the code data. Thus, display process can be facilitated and performed at high speed.

Furthermore, at the time of decoding scalable code data and displaying the image, progressive reproduction can be performed, which improves user convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an reading unit that reads original data to obtain image data;
   an encoder that encodes the image data to obtain code data;
   a storage unit that stores therein the code data;
   a decoder that decodes subcode data to obtain decoded image data, the subcode data being a portion of the code data corresponding to one of a thumbnail image and a preview image of the image data;
   a display unit that displays an image based on the decoded image data, and receives an instruction to output the image, the image being one of the thumbnail image and the preview image; and
   an output unit that outputs the image in response to the instruction.

2. The image processing apparatus according to claim 1, wherein the code data includes a plurality of objects, and the decoder decodes only code data of part of the objects.

3. The image processing apparatus according to claim 2, wherein the decoder decodes only part of the code data of part of the objects.

4. The image processing apparatus according to claim 2, wherein the code data is in JPM format.

5. The image processing apparatus according to claim 1, wherein the subcode data is progressively decoded and reproduced.

6. The image processing apparatus according to claim 1, further comprising a calculating unit that calculates an address of the subcode data to specify a range where the subcode data is stored in the storage unit, wherein
   the decoder decodes only the subcode data based on the address of the subcode data.

7. An image processing apparatus comprising:
   a receiving unit that receives code data obtained by encoding image data;
   a storage unit that stores therein the code data;
   a decoder that decodes subcode data selected from the code data stored in the storage unit to obtain decoded image data, the subcode data being a portion of the code data corresponding to one of a thumbnail image and a preview image of the image data;
   a display unit that displays an image based on the decoded image data, and receives an instruction to output the image, the image being one of the thumbnail image and the preview image; and
   an output unit that outputs the image in response to the instruction.

8. The image processing apparatus according to claim 7, wherein
the code data includes a plurality of objects, and
the decoder decodes only code data of part of the objects.

9. The image processing apparatus according to claim 8, wherein the decoder decodes only part of the code data of part of the objects.

10. The image processing apparatus according to claim 8, wherein the code data is in JPM format.

11. The image processing apparatus according to claim 7, wherein the subcode data is progressively decoded and reproduced.

12. The image processing apparatus according to claim 7, further comprising a calculating unit that calculates an address of the subcode data to specify a range where the subcode data is stored in the storage unit, wherein
the decoder decodes only the subcode data based on the address of the subcode data.

13. An image processing method for displaying an image using a server and a client device, the client device having a display unit of an operation panel, the operation panel including a first storing unit that stores code data, the method including:
receiving, by the client device, a start instruction from the server in response to a document being read by a scanner, the document including image data;
receiving, by the client device, code data corresponding to the image data of the document from the server;
storing, by the client device, the code data in the storing unit;
selecting, by the client device, subcode data from the code data stored in the first storage unit in response to a display instruction for displaying a thumbnail image, the subcode data being a subset of the code data corresponding to the thumbnail image to be displayed;
decoding, by the client device, the thumbnail image based on the selected subcode data; and
displaying, by the client device, the thumbnail image on the operation panel.

14. The method of claim 13, further comprising:
receiving, by the server, a preview display instruction from a user of the operation panel, the preview display instruction indicating an instruction to create a preview image for the displayed thumbnail image;
transmitting, by the server, the preview display instruction to the client device;
selecting, by the client device, subcode data required for creating the preview image from the code data stored in the first storage unit, the subcode data being a subset of the code data corresponding to the preview image to be displayed;
decoding, by the client device, the preview image based on the subcode data required for creating the preview image; and
displaying, by the client device, the preview image on the operation panel.

15. The method of claim 14, further comprising:
storing, by the server, the preview image in a second storage unit;
modifying, by the server, the preview image in the second storage unit based on an instruction from a user, the modifying step including scaling a resolution of the preview image.

16. The method of claim 13, further comprising:
calculating, by the client device, an address of the subcode data to specify a range where the subcode data is stored in the first storage unit, the decoding step decodes only the subcode data based on the address of the subcode data.

17. The method of claim 13, wherein the code data is in JPM format.

* * * * *